US012528303B2

(12) United States Patent
Horita et al.
(10) Patent No.: US 12,528,303 B2
(45) Date of Patent: Jan. 20, 2026

(54) RECORDING DEVICE

(71) Applicant: CANON KABUSHIKI KAISHA, Tokyo (JP)

(72) Inventors: Shingo Horita, Kanagawa (JP); Yusuke Nishiya, Kanagawa (JP); Masakazu Tsukuda, Kanagawa (JP); Yukimichi Kimura, Kanagawa (JP); Kyohei Sato, Kanagawa (JP); Toshiki Hamanishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 18/357,062

(22) Filed: Jul. 21, 2023

(65) Prior Publication Data

US 2024/0131857 A1 Apr. 25, 2024
US 2024/0227420 A9 Jul. 11, 2024
US 2024/0424815 A9 Dec. 26, 2024

(30) Foreign Application Priority Data

Jul. 28, 2022 (JP) ................................ 2022-120131
Aug. 9, 2022 (JP) ................................ 2022-126908

(51) Int. Cl.
*B41J 13/03* (2006.01)
*B41J 2/165* (2006.01)

(52) U.S. Cl.
CPC .......... *B41J 13/03* (2013.01); *B41J 2/16511* (2013.01); *B41P 2235/27* (2013.01)

(58) Field of Classification Search
CPC .... B41J 13/03; B41J 2/16511; B41J 2/16508; B41J 29/02; B41J 29/13; B41J 2/16532; B41J 29/38; B41P 2235/27
See application file for complete search history.

(56) References Cited

U.S. PATENT DOCUMENTS

2007/0240594 A1* 10/2007 Kim ...................... B41J 23/025 101/244
2014/0294476 A1* 10/2014 Hashimoto ............... B41J 3/60 399/361

FOREIGN PATENT DOCUMENTS

JP 2008064186 A * 3/2008
JP 2009-040575 2/2009

OTHER PUBLICATIONS

English Translation of JP2008064186A (Year: 2008).*
U.S. Appl. No. 18/457,275, filed Aug. 28, 2023.

* cited by examiner

*Primary Examiner* — Douglas X Rodriguez
*Assistant Examiner* — Tracey M Mcmillion
(74) *Attorney, Agent, or Firm* — Venable LLP

(57) ABSTRACT

A recording device includes: a drive source; a driven portion having a driven gear; a drive transmission mechanism having a drive gear driven by the drive source and capable of swing between a first position where the drive gear is engaged with the driven gear and a second position where the drive gear is not engaged with the driven gear; and a regulating mechanism capable of swing between a regulating position where swing of the drive transmission mechanism is regulated and a non-regulating position where the swing of the drive transmission mechanism is not regulated. In the recording device, the regulating mechanism is capable of swing around a rotation axis of the driven gear.

19 Claims, 25 Drawing Sheets

RECORDING DEVICE

BACKGROUND OF THE INVENTION

Field of the Invention

The present invention relates to a recording device having a drive switching portion using a pendulum mechanism.

Description of the Related Art

Conventionally, as a recording device for an inkjet printer and the like, a configuration is known in which a connection state of drive or a connection destination of the drive can be switched over by a drive switching portion constituted by a pendulum mechanism having a sun gear and a planetary gear. Japanese Patent Application Publication No. 2009-40575 discloses a configuration in which the drive to a plurality of drive transmission destinations can be switched over by swing of the pendulum mechanism and a position of the pendulum mechanism is regulated by a swingable lever. In the configuration as above, when a drive gear such as a planetary gear and a driven gear at the drive transmission destination are engaged with each other, even if the planetary gear receives a force in a direction of separation away from the driven gear by the swing of the pendulum mechanism or the drive gear receives a reaction force in a direction of separation away from the driven gear, the position of the drive gear is regulated by the lever, and an inter-axis distance between the planetary gear and the driven gear is guaranteed.

SUMMARY OF THE INVENTION

However, in the configuration described above, guarantee accuracy of the inter-axis distance between the planetary gear and the driven gear is affected by positional accuracy of the planetary gear and the driven gear and dimensional accuracy and positional accuracy of each member constituting the lever and the pendulum mechanism. Therefore, it is necessary to guarantee the inter-axis distance between the planetary gear and the driven gear with high accuracy and to stably maintain a drive connected state.

The present invention has been made in view of the aforementioned problem and an object thereof is to provide a recording device which can stably maintain connected/disconnected states of a drive transmission mechanism capable of switching the connection state and a drive transmission destination.

In order to achieve the aforementioned object, the recording device according to the present invention includes the following:

According to the present invention, a recording device which can stably maintain connected/disconnected states of a drive transmission mechanism capable of switching the connection state and a drive transmission destination can be provided.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Image Forming Apparatus

Figure 1:
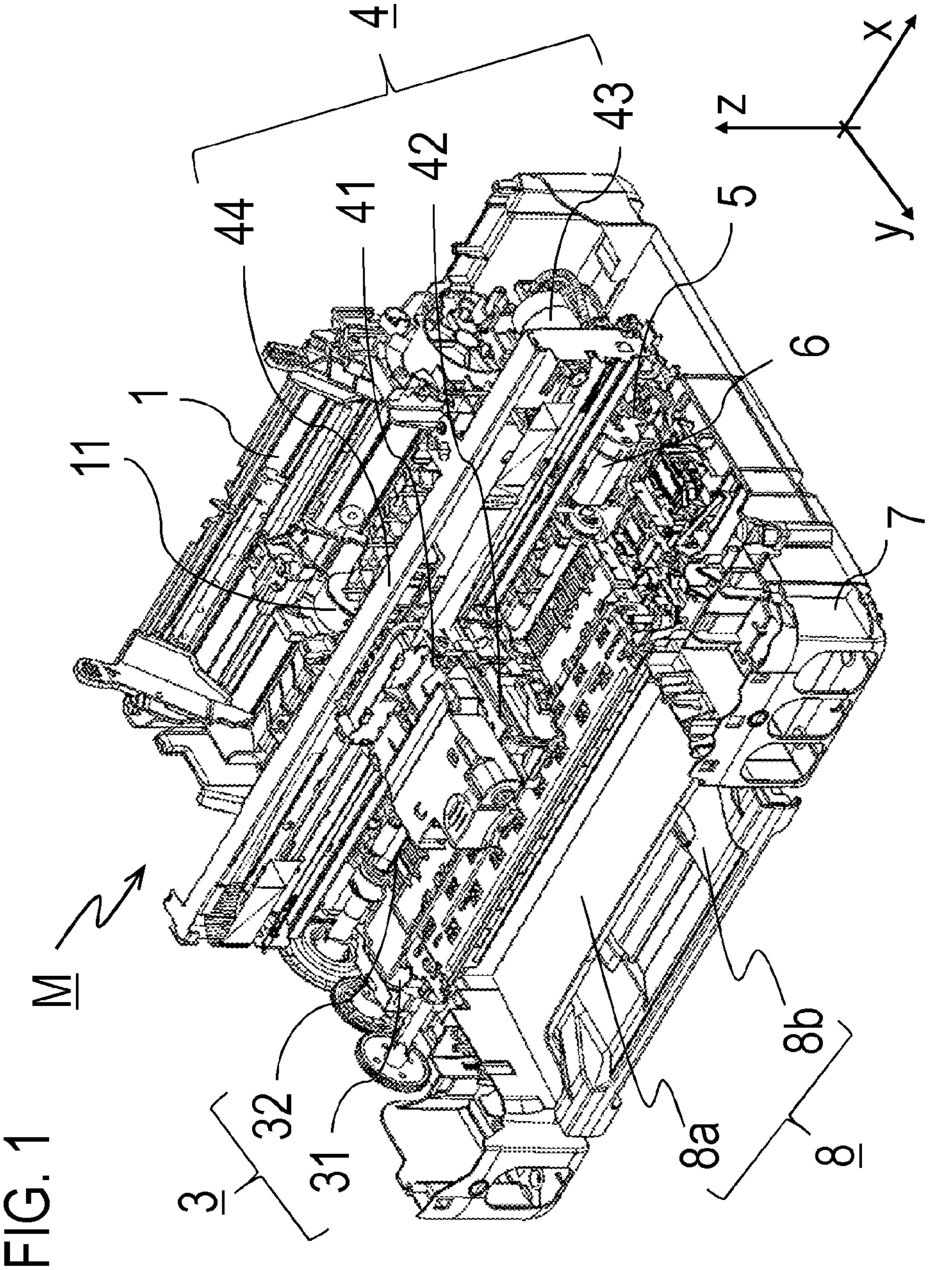
FIG. 1 is a perspective view illustrating an internal configuration of an image forming apparatus according to a first embodiment.

FIG. 1 is a perspective view illustrating an internal configuration of an image forming apparatus M, which is a recording device according to a first embodiment of the present invention. In the following explanation, as shown in FIG. 1, the explanation will be made by assuming that a direction from a left side surface to a right side surface of the image forming apparatus M is an x-direction, a direction from a rear surface to a front surface of the image forming apparatus M is a y-direction, and a direction vertically upward is a z-direction. In this embodiment, a width direction of a recording medium conveyed inside the image forming apparatus M is substantially in parallel with the x-direction, and a conveying direction of the recording medium is substantially in parallel with the y-direction.

The image forming apparatus M is a multifunctional machine including a print portion and a scanner portion (not shown) disposed on the print portion and can execute various types of processing related to an image recording operation and a reading operation by the print portion and the scanner portion individually or interlockingly. The scanner portion includes an ADF (Auto Document Feeder) and an FBS (Flat Bed Scanner) and is capable of reading a manuscript automatically fed by the ADF and reading (scanning) the manuscript placed by a user on a manuscript table of the FBS. Though this embodiment is the multifunctional machine having both the print portion and the scanner portion, the present invention can be applied to the other image forming apparatuses such as a printer not including the scanner portion and the like.

The print portion of the image forming apparatus M includes a paper feed portion 1 on which the recording medium is loaded, a conveying portion 3 which conveys the recording medium fed from the paper feed portion 1, and a recording portion 4 as recording means which records an image on the recording medium conveyed from the conveying portion 3. Moreover, the print portion includes a paper ejection portion 8 onto which the recording medium with the image recorded is ejected and loaded, a maintenance portion 5 which performs maintenance of a recording head 42 of the recording portion 4, and a drive portion 6 which transmits drive of a conveyance motor 31 of the conveying portion 3 to the paper feed portion 1 and the maintenance portion 5.

The paper feed portion 1 includes a paper feed roller 11 and conveys the loaded recording medium by the paper feed roller 11 to the conveying portion 3. The conveying portion 3 includes a conveyance motor 31, which is a drive source and is capable of forward/reverse rotation, and a conveyance roller 32 driven by the conveyance motor 31 and conveys the recording medium by the conveyance roller 32 to a region where recording by the recording portion 4 is performed.

The recording portion 4 includes a carriage 41, the recording head 42 held by the carriage 41, a carriage motor 43 which drives the carriage 41, and a chassis 44 which extends from one end portion to the other end portion in the x-direction in the image forming apparatus M and holds the carriage 41. The carriage 41 is capable of reciprocating scanning in the x-direction along the chassis 44 and performs a recording operation on the recording medium while moving in the x-direction.

The paper ejection portion 8 includes a loading portion **8*a* on which the recording medium is loaded and an extension tray 8*b*** which can be withdrawn with respect to the image forming apparatus M so that the recording medium can be supported when a size of the recording medium is large in the y-direction.

The maintenance portion 5 includes a mechanism which brings a suction cap into contact with the recording head 42 and a suctioning mechanism which suctions ink from an ink ejection port of the recording head 42 by a tube pump. Moreover, the image forming apparatus M has a lock mechanism for locking the carriage 41 at a position where the suction cap is brought into contact with the recording head 42 provided. The lock mechanism stably holds a cap state of the recording head 42 and regulates movement of the carriage 41 during physical-distribution conveyance. Details of a configuration for holding the position of the carriage 41 by the lock mechanism will be described later.

The aforementioned units constituting the print portion are all fastened to a main-body base 7. Moreover, circuit boards (not shown) which control operations of these units are positioned and held on the main-body base 7 and the chassis 44.

Print Operation

Figure 2:
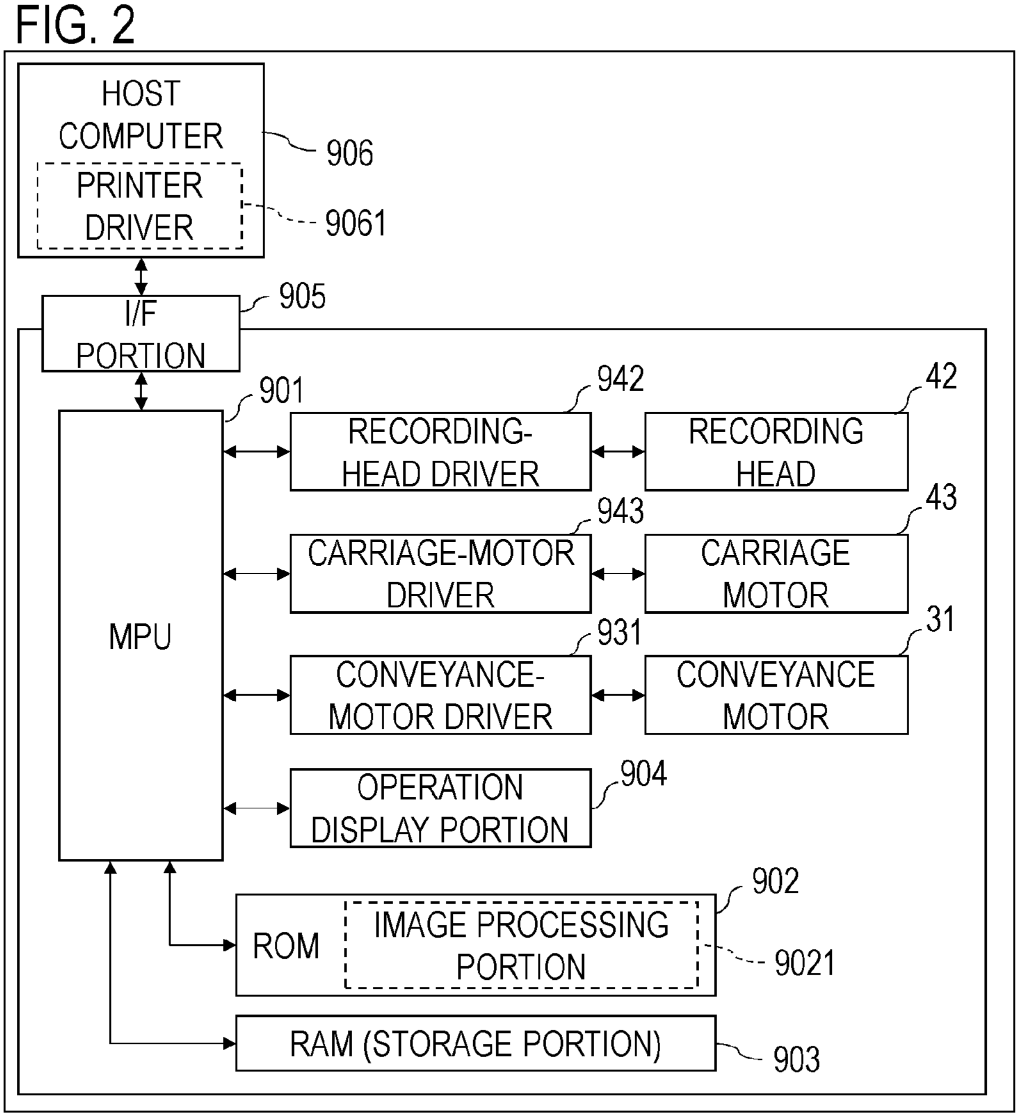
FIG. 2 is a block diagram of the image forming apparatus according to the first embodiment.

FIG. 2 is a block diagram of the image forming apparatus M in this embodiment. The image forming apparatus M includes an MPU 901, a ROM 902, and a RAM 903. The MPU 901 is an MPU which controls operations of each portion, data processing and the like. The ROM 902 is a ROM which stores programs and data executed by the MPU 901 and includes an image processing portion 9021. The RAM 903 is a RAM which temporarily stores processing data executed by the MPU 901 and data received from a host computer 906.

The image forming apparatus M further includes a recording-head driver 942 which controls the recording head 42, a carriage-motor driver 943 which controls the carriage motor 43, and a conveyance-motor driver 931 which controls the conveyance motor 31. The MPU 901 controls an operation display portion 904 in addition to the recording-head driver 942, the carriage-motor driver 943, and the conveyance-motor driver 931. Moreover, the carriage 41 is driven by the carriage motor 43, and the paper feed roller 11, the conveyance roller 32, and an ejection roller are driven by the conveyance motor 31.

The host computer 906 has a printer driver 9061 which processes recording information such as a recorded image, an image grade and the like and communicates with the image forming apparatus when execution of the recording operation is ordered by a user. The MPU 901 exchanges recorded images and the like with the host computer 906 via an OF portion 905.

Drive Portion

Figure 3:
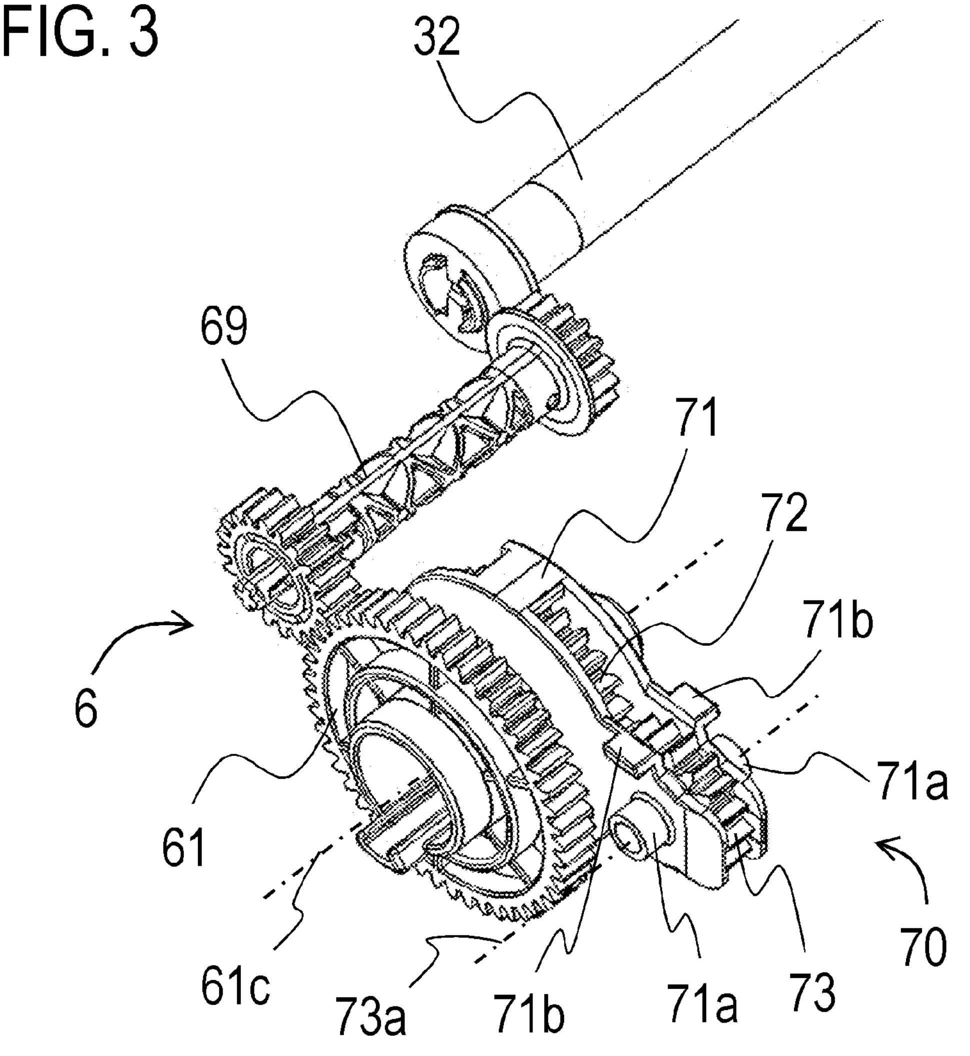
FIG. 3 is a perspective view of a drive switching portion according to the first embodiment.

Subsequently, with reference to FIG. 3, FIG. 4, a configuration of the drive portion 6 of the first embodiment will be explained. FIG. 3 is a perspective view illustrating a configuration of a drive switching portion disposed in the drive portion 6.

An input gear 61 is connected to the conveyance motor 31, which is a drive source, through a drive train, not shown, the conveyance roller 32, and an idler gear 69 and is rotated with the drive of the conveyance motor 31. Moreover, the drive switching portion has a pendulum mechanism 70 constituted by a planetary arm 71, a sun gear 72, and a planetary gear 73 as a drive transmission mechanism which transmits a drive force of the conveyance motor 31.

The planetary arm 71 has a shaft portion of the input gear 61 inserted therethrough and is pressed to the shaft portion of the input gear 61 by a friction spring, not shown. Therefore, the planetary arm 71 swings coaxially with a rotation axis 61*c* of the input gear 61 by frictional drive, when the input gear 61 is rotated. Moreover, the planetary arm 71 has a cylindrical axial support portion 71*a* extending in parallel with the rotation axis 61*c* and a first regulating portion 71*b* by which the swing of the planetary arm 71 is regulated.

The sun gear 72 has the shaft portion of the input gear 61 inserted therethrough and is engaged with an engaging portion of the input gear 61. Therefore, the sun gear 72 is rotated and driven coaxially with the rotation axis 61*c* of the input gear 61, when the input gear 61 is rotated. That is, the sun gear 72 is drive-connected with the input gear 61 at all time.

The planetary gear 73 is axially supported by the planetary arm 71 rotatably by a rotation axis 73*a* in parallel with the rotation axis 61*c* of the input gear 61. Moreover, the planetary gear 73 is engaged with the sun gear 72 at all time and has a drive force transmitted from the sun gear 72.

Figure 4:
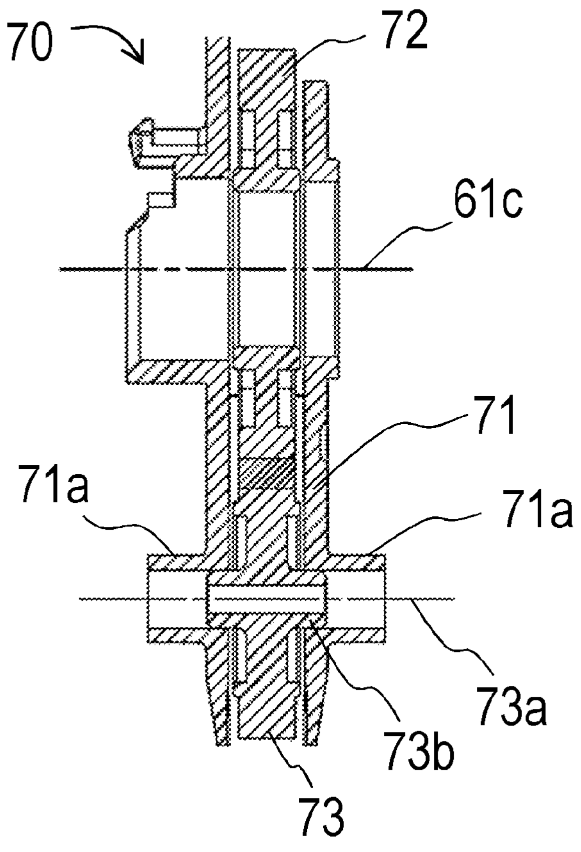
FIG. 4 is a sectional view of a planetary-gear axial support portion of a planetary arm according to the first embodiment.

With reference to FIG. 4, the axial support portion of the planetary gear 73 of the planetary arm 71 will be explained in more detail. FIG. 4 is a sectional view of the pendulum mechanism 70 when seen from a direction orthogonal to the rotation axis 73*a* and illustrates a state where the planetary arm 71 axially supports the planetary gear 73. The planetary arm 71 is provided so as to sandwich the planetary gear 73 in the axis direction of the planetary gear 73, and a shaft portion 73*b* of the planetary gear 73 is inserted into an inner diameter of the axial support portion 71*a* of the planetary arm 71. The axial support portion 71*a* has the inner diameter and an outer diameter thereof concentric and axially supports the shaft portion of the planetary gear 73 on the inner diameter side and thus, it is configured such that a center of the outer diameter and a center of the inner diameter of the axial support portion 71*a* are located on the rotation axis 73*a* of the planetary gear 73.

The image forming apparatus M in this embodiment can be switched between a state where the planetary gear 73 is connected to a subsequent-stage gear (driven gear) and a state where the planetary gear 73 is separated and disconnected from the subsequent-stage gear by causing the planetary arm 71 to swing by the pendulum mechanism 70 configured as above.

Lock Mechanism

Figure 5B:
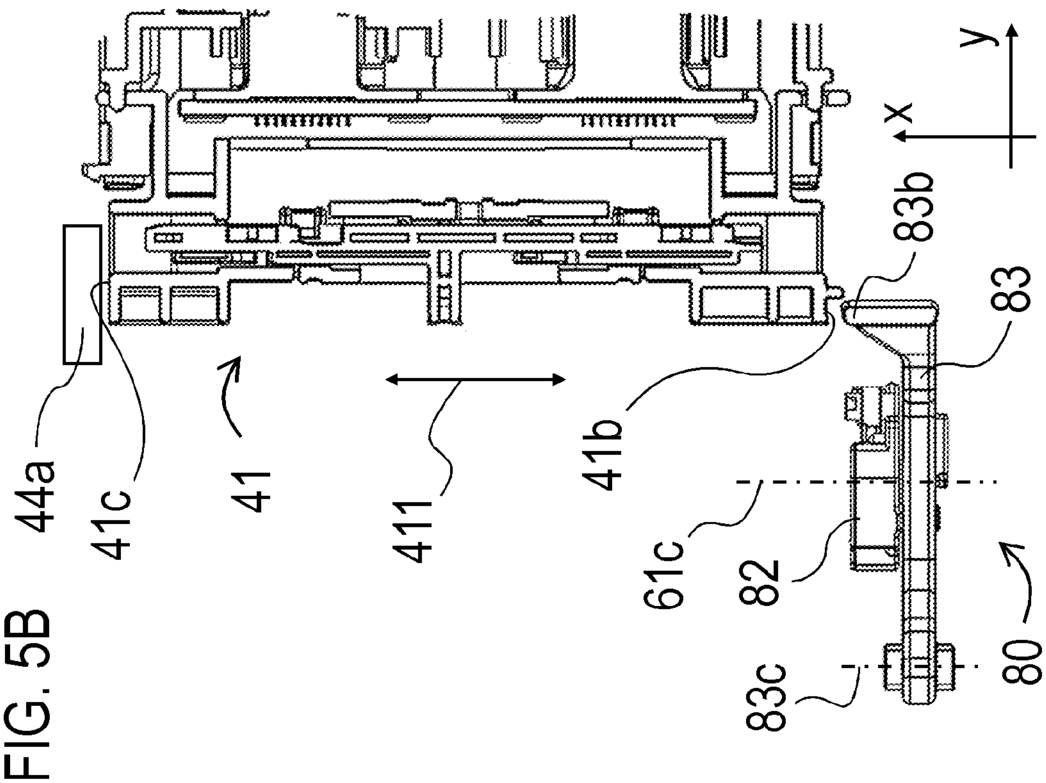
FIG. 5A and FIG. 5B are diagrams illustrating a positional relationship between a carriage and a lock mechanism according to the first embodiment.
Figure 5A:
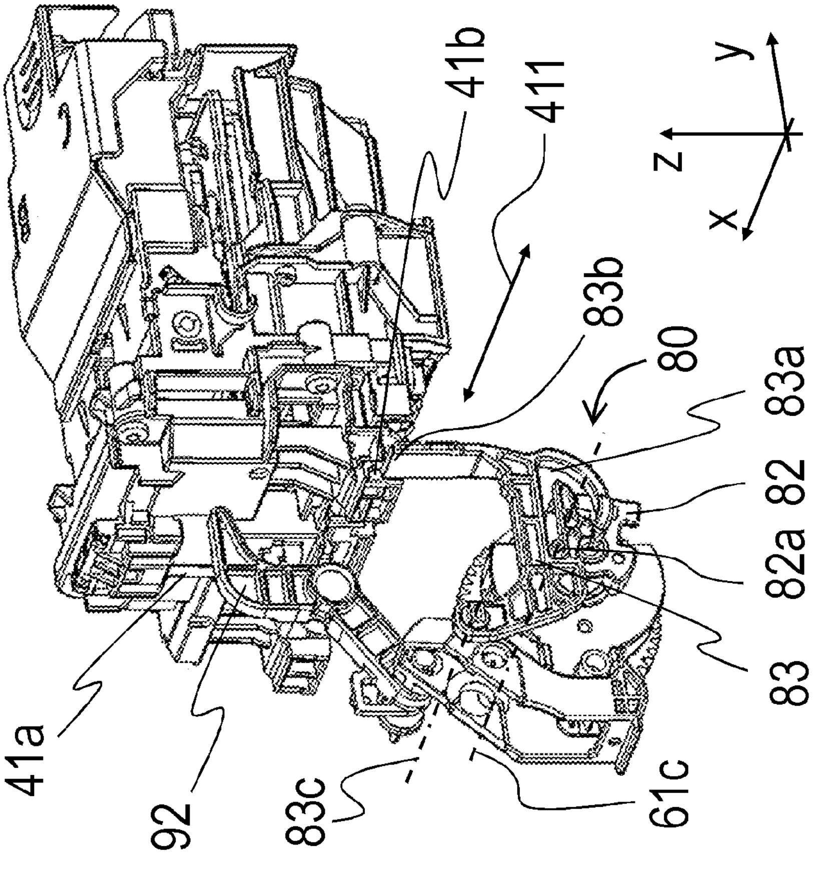
Figure 6B:
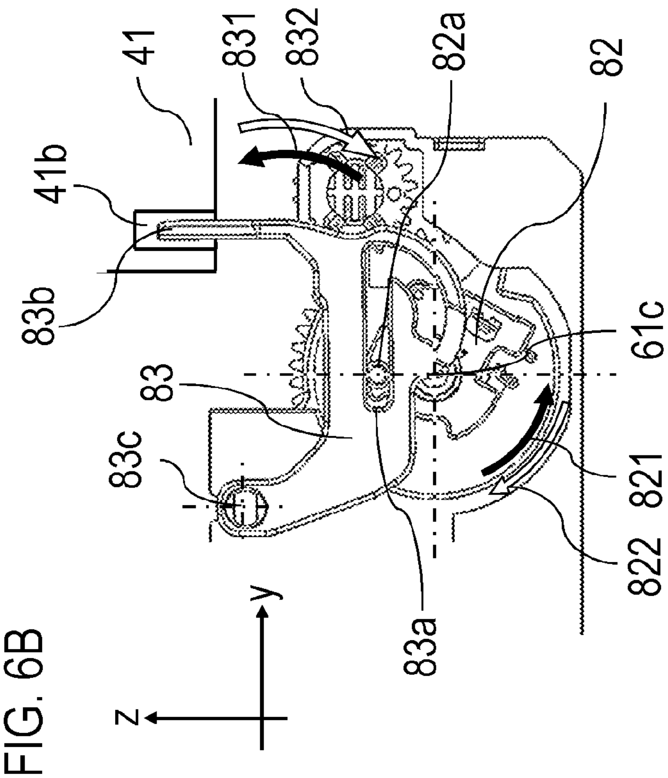
FIG. 6A and FIG. 6B are side views illustrating an operation of the lock mechanism according to the first embodiment.
Figure 6A:
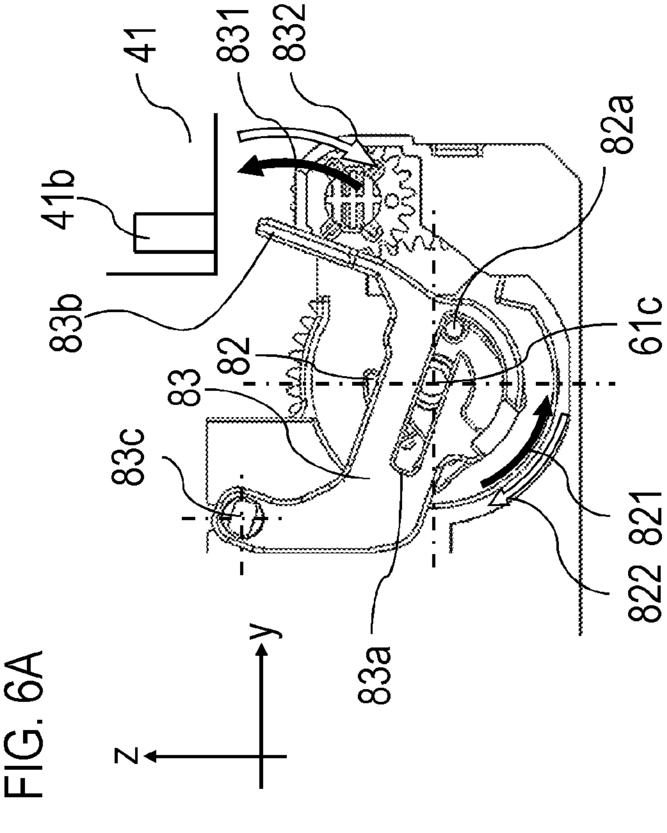

Subsequently, a lock mechanism 80 which locks the carriage 41 on which the recording head 42 is mounted at a capping position will be explained by referring to FIG. 5A, FIG. 5B, FIG. 6A, FIG. 6B. FIG. 5A is a perspective view illustrating a positional relationship between the carriage 41 and the lock mechanism 80, and FIG. 5B is a top view thereof. FIG. 6A is a side view illustrating the carriage 41 and the lock mechanism 80 when the lock mechanism 80 is at a non-operating position where it does not lock the carriage 41. FIG. 6B is a side view illustrating the carriage 41 and the lock mechanism 80 when the lock mechanism 80 is at an operating position where it locks the carriage 41.

The carriage 41 has a pressing portion 41*a* for regulating swing of the planetary arm 71, a contact portion 41*b* in contact with the lock mechanism 80 when the lock mechanism 80 is at the operating position, and a contact portion 41*c* in contact with a chassis end portion 44*a*. When the recording operation on the recording medium is performed, the carriage 41 scans and moves in an arrow 411 direction shown in FIG. 5A, FIG. 5B. On the other hand, during the physical distribution or the like, in order to prevent unintended movement of the carriage 41, the carriage 41 is locked by the lock mechanism 80, and movement thereof is regulated.

The lock mechanism 80 includes a drive member 82 and a lever member 83. The drive member 82 is engaged with the input gear 61 and is a rotational member coaxial with the rotation axis 61*c* of the input gear 61 and rotatable in the same direction as that of the input gear 61 by a frictional force acting between it and the input gear 61, when the input gear 61 is rotated. The drive member 82 includes a columnar link portion 82*a* protruding in a rotation axis direction at a position different from the rotation axis, and when the drive member 82 is rotated, the link portion 82*a* makes a circular motion around the rotation axis 61*c*.

The lever member 83 has a cam portion 83*a* engaged with the link portion 82*a* and an engaging portion 83*b* which is brought into contact with the carriage 41 and regulates the scanning of the carriage 41, and it is configured capable of swing with a swing axis 83*c*, which is different from the drive member 82. When the drive member 82 is rotated, the link portion 82*a* makes a circular motion, and when the link portion 82*a* slides with the cam portion 83*a*, the drive force is transmitted to the lever member 83, and the lever member 83 swings around the swing axis 83*c*, while being regulated by the cam portion 83*a*.

The drive member 82 is connected to the conveyance roller 32 via a member such as the input gear 61. When the conveyance roller 32 is driven in a forward direction (direction in which the recording medium is conveyed to the ejection roller side), as shown in FIG. 6A, the link portion 82*a* moves with the swing of the drive member 82 in an arrow 822 direction. Then, the lever member 83 swings in an arrow 832 direction around the swing axis 83*c*, the engaging portion 83*b* of the lever member 83 moves to a position where the movement of the carriage 41 in a scanning direction (arrow 411 direction) is not regulated, and the lever member 83 moves to the non-operating position (retreat side). That is, when the lever member 83 retreats from a scanning path of the carriage 41 and is located at the non-operating position, the engagement between the lock mechanism 80 and the carriage 41 is released, the lock mechanism 80 is brought to the non-operating state, and the carriage 41 can make a reciprocating motion in the scanning direction.

When the conveyance roller 32 is driven to an opposite direction (direction opposite to the forward direction), as shown in FIG. 6B, the link portion 82*a* moves with the swing of the drive member 82 in an arrow 821 direction. Then, the lever member 83 swings in a direction of an arrow 831 around the swing axis 83*c*, and the engaging portion 83*b* goes to a position on the scanning path of the carriage 41, where the scanning movement is shut off. When the lever member 83 is located at the operating position where the lever member 83 regulates the movement of the carriage 41, the chassis end portion 44*a* is located at one side in the scanning direction of the carriage 41, while the engaging portion 83*b* is located on the other side, whereby the movement of the carriage 41 in the scanning direction is regulated. At this time, even if a force is applied to the carriage 41, since the contact portion 41*c* of the carriage 41 is brought into contact with the chassis end portion 44*a* for one side, while the contact portion 41*b* of the carriage 41 is brought into contact with the engaging portion 83*b* on the other side, whereby the movement from that position is regulated. As described above, by holding the carriage 41 by the lock mechanism 80 at the predetermined position, damage on the carriage 41 during the physical distribution or removal of the suction cap from the recording head 42 can be prevented.

Ink Suctioning Mechanism

Figure 7:
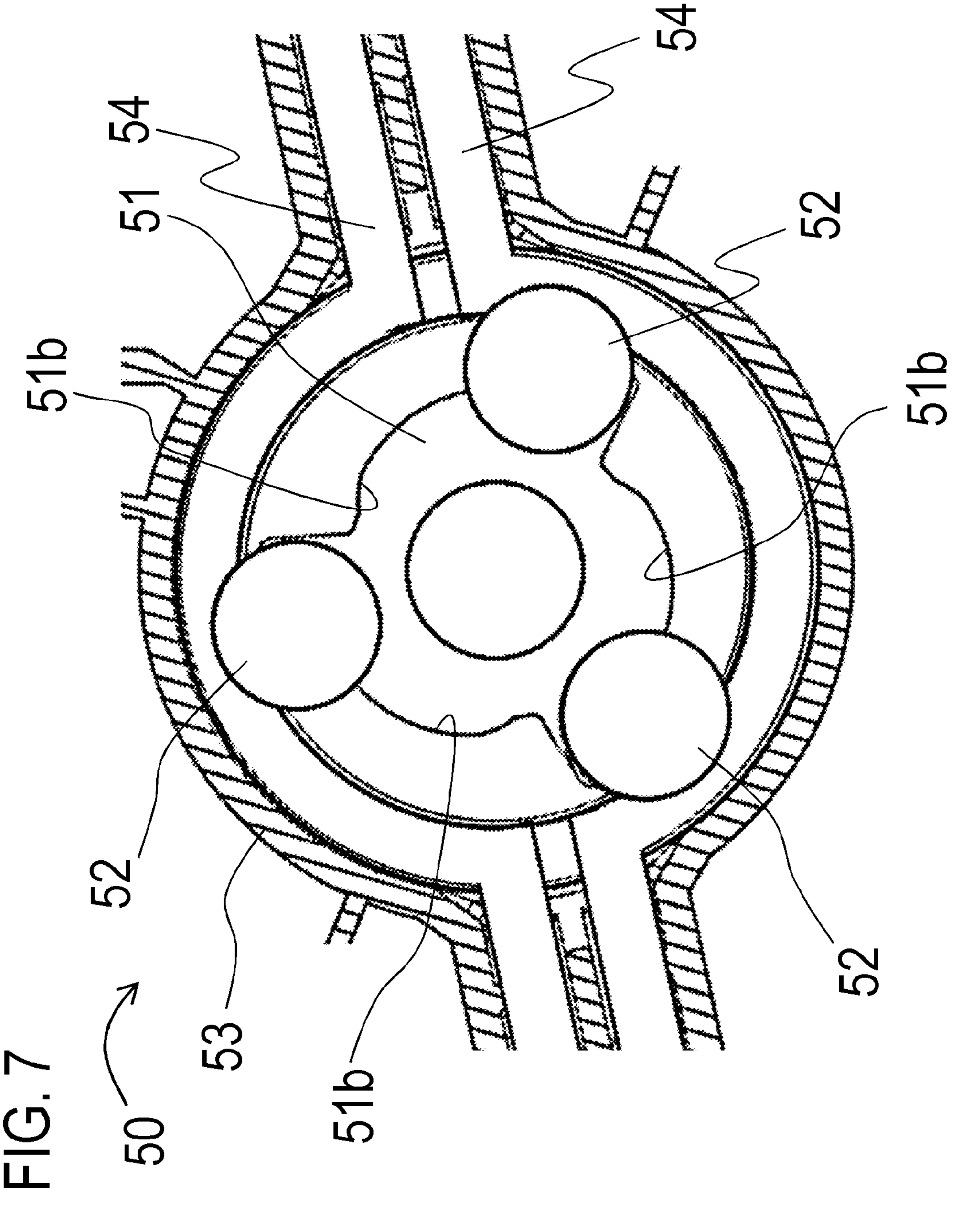
FIG. 7 is a sectional view illustrating a configuration of an ink suctioning mechanism according to the first embodiment.

Subsequently, an ink suctioning mechanism 50 which suctions a liquid from the ink ejection port of the recording head 42 will be explained by referring to FIG. 7. FIG. 7 is a sectional view illustrating a configuration of the ink suctioning mechanism 50.

The ink suctioning mechanism 50 is a suctioning mechanism including a roller holder 51, a pump roller 52, a pump base 53, and a pump tube 54. The pump base 53 has an arc-shaped wall surface, and two pieces of the pump tubes 54 are disposed along the wall surface. The pump tubes 54 are connected to storage means and the recording head 42 through a suction cap, respectively, and the suctioned liquid passes though inside. The roller holder 51 is a rotating member which is located on an inner side of the arc-shaped wall surface of the pump base 53 and rotatably and axially supported by the pump base 53. The roller holder 51 has a guide shape 51*b* movably and rotatably holding the three pump rollers 52. Note that the recording head 42 in this embodiment is capable of ejecting ink in four colors, that is, black, cyan, magenta, and yellow, and one of the pump tubes 54 of the ink suctioning mechanism 50 is a conveyance path for the ink in black, while the other of the pump tubes 54 is conveyance paths for the ink in the other colors.

In FIG. 7, when the roller holder 51 rotates counterclockwise, each of the pump rollers 52 moves to an outside in a radial direction along the guide shape 51*b* provided on the roller holder 51 and is brought into a charge state in which the pump tube 54 is crushed, which is a state where the liquid can be suctioned. If the rotation of the roller holder 51 is further continued, the pump roller 52 moves in the rotating direction of the roller holder 51 while crushing the pump tube 54. Therefore, the ink suctioning mechanism 50 can send out a gas/liquid inside the pump tube 54 to the rotating direction of the roller holder 51 and convey the suctioned liquid to the storage means.

When the roller holder 51 is rotated clockwise, each of the pump rollers 52 moves to the inner side in the radial direction along the guide shape 51*b* provided on the roller holder 51 and separates away from the pump tube 54, and a state where the charge to the pump tube 54 is released is brought about. If the rotation of the roller holder 51 is further continued, the pump roller 52 moves in the rotating direction of the roller holder 51 in the state separated away from the pump tube 54. Therefore, the gas/liquid inside the pump tube 54 is not conveyed to the recording head 42. By configuring as above, the ink suctioning mechanism 50 in this embodiment is switchable between suctioning and non-suctioning in accordance with the rotating direction of the roller holder 51.

Drive Train

Figure 8:
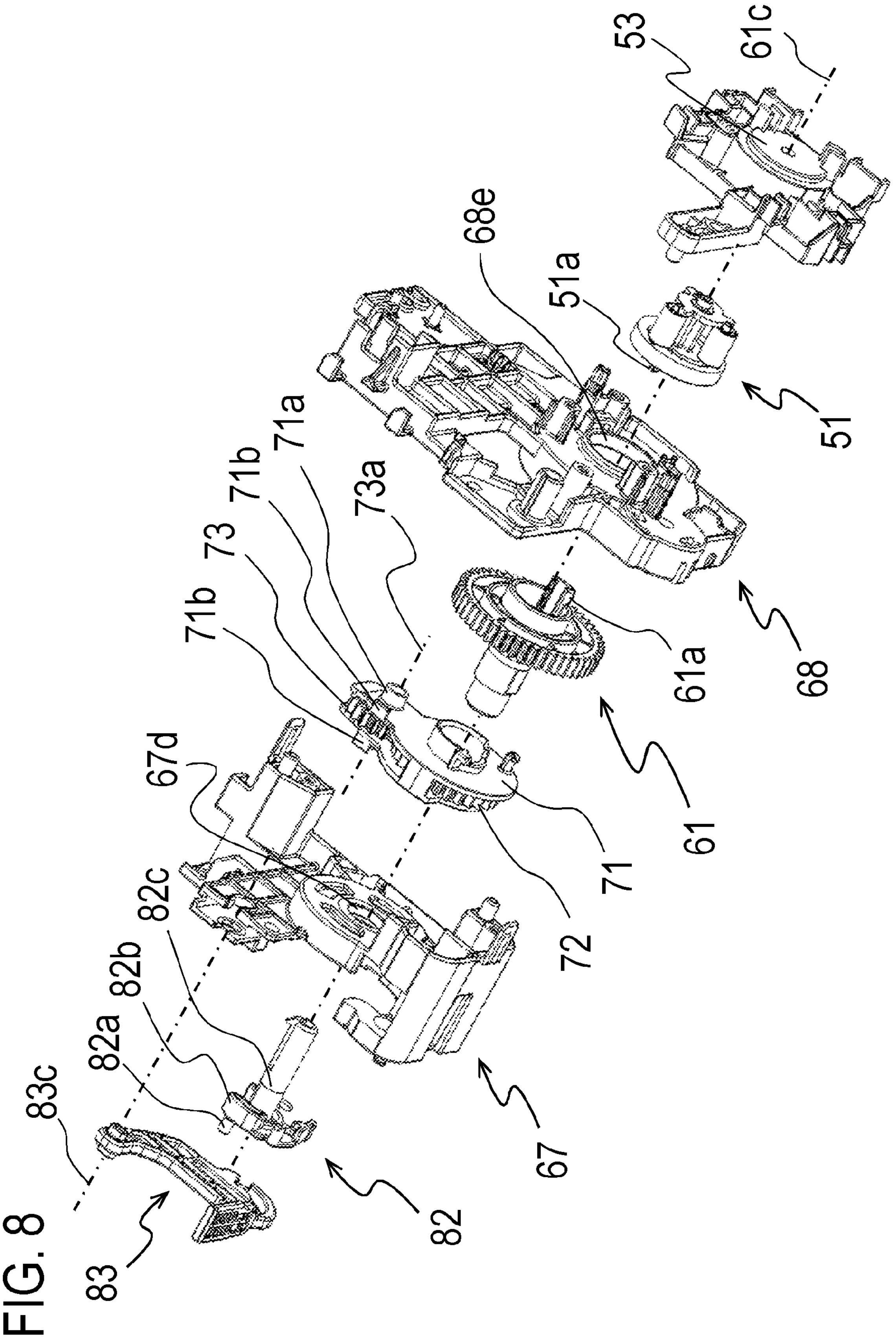
FIG. 8 is an exploded perspective view illustrating a configuration of a drive train according to the first embodiment.
Figure 9A:
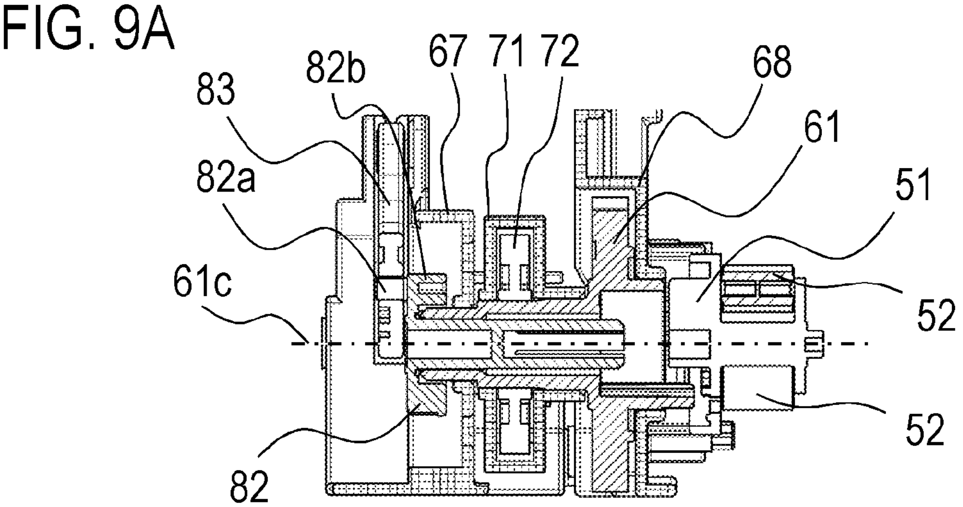
FIG. 9A and FIG. 9B are sectional views illustrating the configuration of the drive train according to the first embodiment.
Figure 9B:
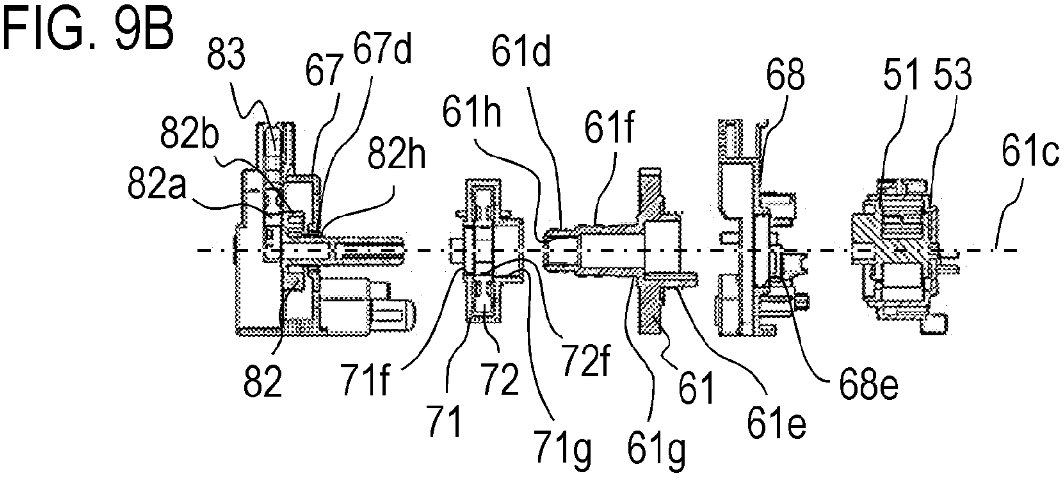

Subsequently, details of a configuration of the drive train connected to the input gear 61 will be explained with reference to FIG. 8, FIG. 9A and FIG. 9B. FIG. 8 is an exploded perspective view illustrating disposition of components constituting the dive train. FIG. 9A and FIG. 9B are sectional views on a plane including the rotation axis of the input gear 61, which is a component shown in FIG. 8. FIG. 9A is a sectional view of a section including the rotation axis 61*c* of the input gear 61 and illustrates a state when the components constituting the drive train are engaged with one another. FIG. 9B is an exploded view of FIG. 9A.

The input gear 61 is a cylindrical shaft portion protruding to both sides in the rotation axis direction and has a shaft portion functioning as an input shaft for driving the other members by a drive force of the conveyance motor 31, which is a drive source. On an outer peripheral surface and an inner peripheral surface of the shaft portion, fitting shafts 61*d*, 61*e*, 61*f*, 61*g* and a fitting hole 61*h* for fitting with each of the components of the drive portion are provided. The fitting shaft 61*d* and the fitting hole 61*h* are located on the end portion in the rotation axis direction of the input gear 61, and a cylinder portion on which the fitting shaft 61*d* and the fitting hole 61*h* are formed is provided on the end portion of the shaft portion. A sectional shape of each of the fitting portions of the input gear 61 is a substantially circular shape around the rotation axis 61*c* of the input gear 61. On one end side in the axis direction of the input gear 61, a cover member 68, the roller holder 51, and the pump base 53 are mounted in order from a side closer to the input gear 61. Moreover, on the other end side in the axis direction of the input gear 61, the planetary arm 71, a base member 67, the drive member 82, and the lever member 83 are mounted in order from the side closer to the input gear 61.

The base member 67 is a support member which supports the other members constituting the drive train and becomes a base for the drive train and is connected to the main-body base 7. The base member 67 has a fitting hole 67*d* into which the fitting shaft 61*d* of the input gear 61 is inserted.

The cover member 68 is a support member which supports the other members constituting the drive train similarly to the base member 67 and is mounted on the base member 67. Moreover, the cover member 68 has a fitting hole 68*e* into which the fitting shaft 61*e* of the input gear 61 is inserted.

Regarding the input gear 61, the fitting shaft 61*d* protruding to one side in the axis direction is inserted into the fitting hole 67*d*, and the fitting shaft 61*e* protruding to the other side is inserted into the fitting hole 68*e*. That is, the input gear 61 is rotatably and axially supported around the rotation axis 61*c* of the input gear 61 from both ends in the axis direction by the base member 67 and the cover member 68, which are axial support members.

The planetary arm 71 has a fitting hole 71*f* into which the fitting shaft 61*f* of the input gear 61 is inserted and a fitting hole 71*g* into which the fitting shaft 61*g* is inserted. The planetary arm 71 is held by the input gear 61 swingably around the rotation axis 61*c* of the input gear 61.

The sun gear 72 has a fitting hole 72*f* into which the fitting shaft 61*f* of the input gear 61 is inserted and is held by the input gear 61 rotatably around the rotation axis 61*c* of the input gear 61.

The planetary arm 71, the sun gear 72, and the planetary gear 73 supported by the planetary arm 71 are disposed between the base member 67 and the cover member 68 which axially support the input gear 61.

The drive member 82 has the link portion 82*a*, a link forming portion 82*b*, and a substantially cylindrical shaft portion 82*c*, which is a rotation shaft portion of the drive member 82. In the shaft portion 82*c* of the drive member 82, a fitting shaft 82*h* is formed, and the fitting shaft 82*h* is inserted into the fitting hole 61*h* of the input gear 61. That is, the drive member 82 is axially supported by the cylinder portion of the input gear 61 in which the fitting shaft 61*d* is formed on the outer diameter and the fitting hole 61*h* in the inner diameter. When the drive member 82 and the input gear 61 are fitted with each other, the base member 67 is located by being sandwiched by the drive member 82 and the input gear 61. At this time, the link forming portion 82*b* is located on a side opposite to the input gear 61 with respect to the base member 67. The shaft portion 82*c* of the drive member 82 is pressed and urged by a friction spring, not shown, with respect to the input gear 61, and when the input gear 61 is rotated, it rotates coaxially with the rotation axis 61*c* of the input gear 61 by a frictional force. When the drive member 82 is rotated, the link portion 82*a* on the link forming portion 82*b* is brought into contact and slides with the cam portion 83*a* provided on the lever member 83, and the lever member 83 is driven.

On the shaft portion on the cover member 68 side of the input gear 61, an engaging portion 61*a* to be engaged with an engaged portion 51*a* of the roller holder 51 is provided. The roller holder 51 is disposed so that a rotation center of the roller holder 51 is located on the rotation axis 61*c* of the input gear 61. When the input gear 61 is rotated, the engaging portion 61*a* is engaged with the engaged portion 51*a*, and the drive is transmitted from the input gear 61 to the roller holder 51. The pump base 53 axially supports the rotation axis portion of the roller holder 51 and is mounted on the cover member 68.

As described above, in this embodiment, the rotation center of each of the pendulum mechanism which performs drive switching, the drive portion of the lock mechanism which regulates the position of the carriage, and the roller holder, which is the drive portion of the ink suctioning mechanism, is disposed on the rotation axis 61*c* of the input gear 61. As a result, there is no more need to provide a separate input gear for each of drive input portions, but a common input gear can be used and thus, reduction in the number of components of the image forming apparatus M, space saving, and size reduction can be realized.

Regulating Mechanism

Figure 10A:
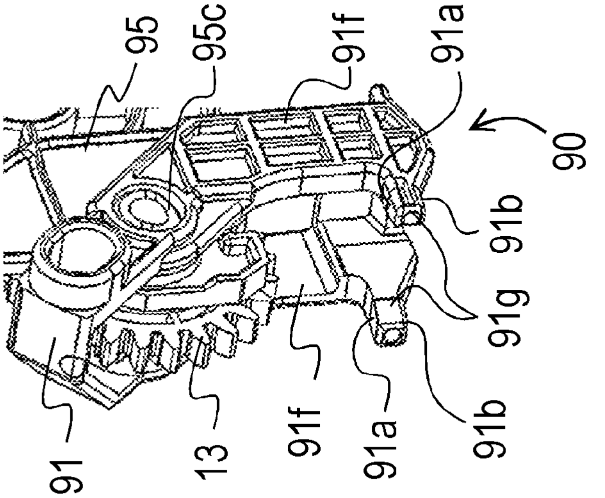
FIG. 10A to FIG. 10C are diagrams illustrating the configuration of a regulating mechanism according to the first embodiment.
Figure 10B:
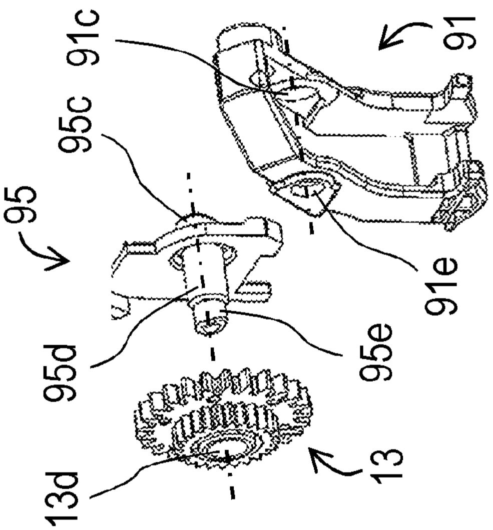
Figure 10C:
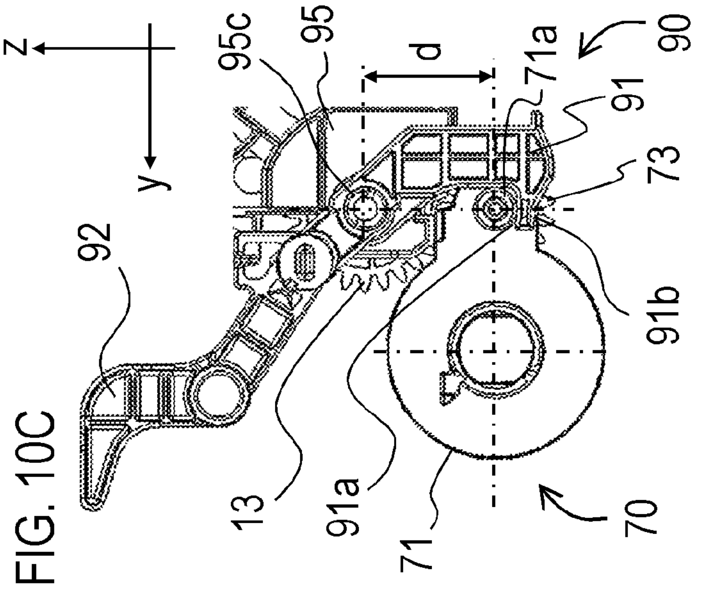

Subsequently, configurations of the drive switching portion and holding means for holding connected/disconnected states of the drive in this embodiment will be explained with reference to FIG. 10A to FIG. 10C. The holding means in this embodiment is constituted by a regulating mechanism 90 which regulates the swing of the pendulum mechanism 70. FIG. 10A is a perspective view illustrating configurations of the regulating mechanism 90 and peripheral members. FIG. 10B is an exploded perspective view illustrating the configurations of the regulating mechanism 90 and the peripheral members. FIG. 10C is a side view illustrating a state in which the regulating mechanism 90 regulates the swing of the pendulum mechanism 70, and the holding means holds the connected state of the drive.

The regulating mechanism 90 includes a planetary arm lock 91, which is a regulating member capable of regulating the swing of the pendulum mechanism 70, and a paper-feed gear base 95 which supports the planetary arm lock 91. The paper-feed gear base 95 in this embodiment further supports the drive train of the paper feed portion 1 including a paper-feed input gear 13. The paper-feed input gear 13 is provided at a position capable of being engaged with the planetary gear 73, and the drive force of the input gear 61 is transmitted through the planetary gear 73 and the sun gear 72.

The paper-feed gear base 95 has cylindrical fitting shafts 95*c*, 95*d*, 95*e*, and each of the fitting portions is concentric. The paper-feed input gear 13 is a gear at an end of the drive train which transmits the drive to the paper feed portion 1 and has a fitting hole 13*d*. The paper-feed input gear 13 is rotatably and axially supported by the paper-feed gear base 95 by insertion of the fitting shaft 95*d* into the fitting hole 13*d*. The paper-feed input gear 13 is provided on a swing locus of the planetary gear 73 of the pendulum mechanism 70 in the drive switching portion, and the drive force transmitted from the planetary gear 73 is transmitted to the paper feed portion 1, which is a driven portion, through the paper-feed input gear 13.

The planetary arm lock 91 has a fitting hole 91*c* into which the fitting shaft 95*c* is inserted and a fitting hole 91*e* into which the fitting shaft 95*e* is inserted and is swingably and axially supported by the paper-feed gear base 95. That is, the rotation axis of the paper-feed input gear 13 and the swing axis of the planetary arm lock 91 are on the same axis. Moreover, the planetary arm lock 91 is engaged with the paper-feed gear base 95 so as to sandwich the paper-feed input gear 13 and the paper-feed gear base 95. The planetary arm lock 91 in this embodiment is formed of a resin material and can be engaged with the paper-feed gear base 95 by being deflected.

The planetary arm lock 91 further has, in the rotation axis direction of the planetary arm lock 91, two arm portions 91*f* extending in a direction orthogonal to the rotation axis direction on both sides of the paper-feed gear base 95 and a protruding portion 91*g* protruding in a direction orthogonal to the rotation axis direction on a distal end portion of each of the arm portions 91*f*. On the protruding portion, a first holding portion 91*a*, which is a first surface for regulating the swing of the pendulum mechanism 70, and a second holding portion 91*b*, which is a second surface, are formed. The first holding portion 91*a* and the second holding portion 91*b* in this embodiment are planes facing directions opposite to each other.

The planetary arm lock 91 is capable of swing between a position where the protruding portion 91*g* is located on the swing locus of the planetary arm 71 and regulates the swing of the planetary arm 71 and a position where the protruding portion 91*g* retreats from the swing locus of the planetary arm 71, and the planetary arm 71 is capable of swing. A distal end portion on a side opposite to the distal end portion on which the protruding portion 91*g* of the planetary arm lock 91 is provided is connected to a planetary-arm lock lever 92. The planetary-arm lock lever 92 is a member for causing the planetary arm lock 91 to swing. Details of a motion when the planetary arm lock 91 swings by the swing of the planetary-arm lock lever 92 will be described later.

In this embodiment, as shown in FIG. 10C, an inter-axis distance between the planetary gear 73 and the paper-feed input gear 13 when the planetary gear 73 and the paper-feed input gear 13 are connected is a distance d. When the planetary gear 73 and the paper-feed input gear 13 are connected, seen from the rotation axis direction of the planetary arm lock 91, a straight line connecting the rotation centers of the planetary gear 73 and the paper-feed input gear 13 is orthogonal to a straight line connecting the swing center of the planetary arm 71 and the rotation center of the planetary gear 73. By disposing the components as above, a direction in which the straight line connecting the rotation centers of the planetary gear 73 and the paper-feed input gear 13 extends matches a tangent direction of the swing locus when the planetary gear 73 is separated away from the paper-feed input gear 13 and thus, variation in the inter-axis distance caused by dimensional accuracy of the component or the like can be made small.

Drive Switching Operation

Subsequently, operations of the drive switching portion and the holding means for holding the connected/disconnected states of the drive in this embodiment will be explained with reference to FIG. 11A to FIG. 11D and FIG. 12A and FIG. 12B. FIG. 11A to FIG. 11D are diagrams when the pendulum mechanism 70 and the regulating mechanism 90 are seen from the swing center direction of the planetary arm 71.

As described above, the pendulum mechanism 70 can switch the connection state of the planetary gear 73 and the paper-feed input gear 13 (driven gear) by the swing of the planetary arm 71. In the following explanation, a position of the pendulum mechanism 70 where the planetary gear 73 is engaged with and connected to the paper-feed input gear 13 is referred to as a first position, and a position of the pendulum mechanism 70 where the planetary gear 73 is separated away from the paper-feed input gear 13, and the connection was released as a second position. Moreover, the regulating mechanism 90 is switched to a state where the swing of the planetary arm 71 is regulated by the swing of the planetary arm lock 91 and a state not regulated. In the following explanation, a position of the regulating mechanism 90 where the planetary arm lock 91 regulates the swing of the planetary arm 71 and holds the position of the pendulum mechanism 70 is referred to as a regulating position, and a position of the regulating mechanism 90 where the planetary arm lock 91 does not regulate the swing of the planetary arm 71 as a non-regulating position.

Figure 11D:
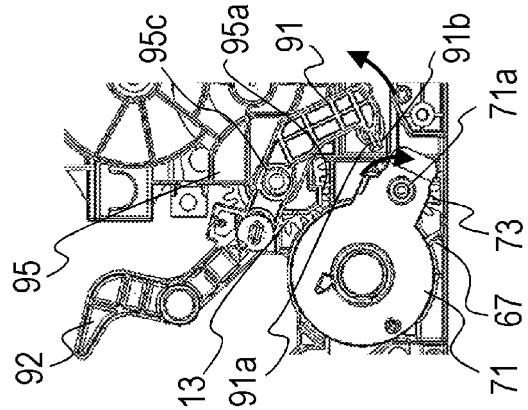
FIG. 11A to FIG. 11D are side views illustrating an operation of a pendulum mechanism and the regulating mechanism according to the first embodiment.
Figure 11C:
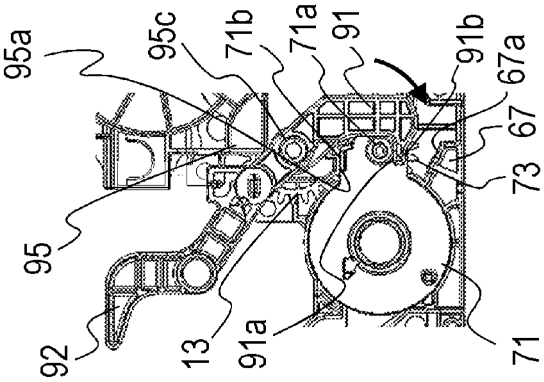
Figure 11B:
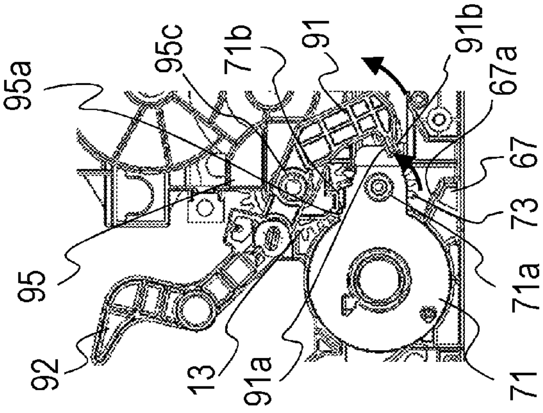
Figure 11A:
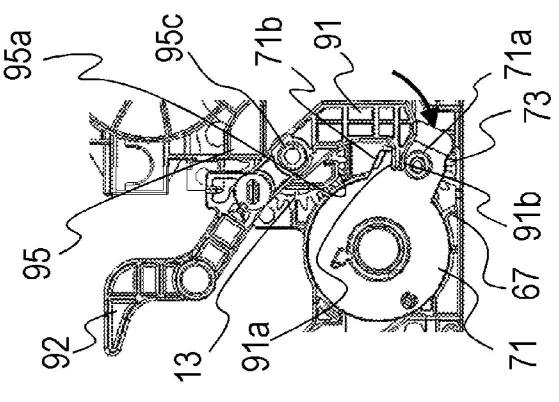

FIG. 11A illustrates a state where the pendulum mechanism 70 is at the second position, and the regulating mechanism 90 is at the regulating position. At this time, the planetary gear 73 is at a position separated away from the paper-feed input gear 13, and the planetary gear 73 and the paper-feed input gear 13 are disconnected. Moreover, the second holding portion 91*b* of the planetary arm lock 91 is brought into contact with the axial support portion 71*a* of the planetary arm 71, and the swing locus of the planetary arm 71 in a direction in which the planetary gear 73 approaches the paper-feed input gear 13 (counterclockwise direction in FIG. 11A) is shut off. Furthermore, the swing locus of the planetary arm 71 in a direction in which the planetary gear 73 is separated away from the paper-feed input gear 13 (clockwise direction in FIG. 11A) by a second contact portion 67*a* provided on the base member 67 is shut off. That is, the base member 67 having the second contact portion 67*a* also functions as a second regulating member which regulates the swing of the pendulum mechanism 70.

By configuring as above, when the pendulum mechanism 70 is at the second position, the swing of the pendulum mechanism 70 is regulated by the second holding portion 91*b* of the planetary arm lock 91 and the second contact portion 67*a* of the base member 67, and the position of the pendulum mechanism 70 is held. Therefore, with the rotation of the input gear 61, even when the force to cause the planetary arm 71 to swing acts, the planetary gear 73 can hold the position separated away from the paper-feed input gear 13. Note that, when the pendulum mechanism 70 is at the second position, and the regulating mechanism 90 is at the regulating position, the second holding portion 91*b* does not necessarily have to be brought into contact with the axial support portion 71*a*, but a gap may be provided.

FIG. 11B illustrates a state in which the pendulum mechanism 70 is at the first position, and the regulating mechanism 90 is at the non-regulating position. Subsequently, operations that the regulating mechanism 90 swings from the regulating position to the non-regulating position, the pendulum mechanism 70 swings from the second position to the first position, and the image forming apparatus M changes from the state in FIG. 11A to the state in FIG. 11B will be explained.

Figure 12B:
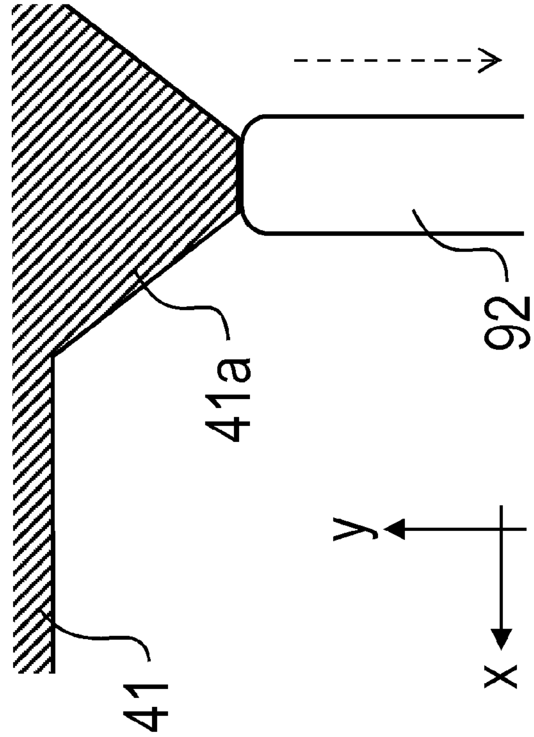
FIG. 12A and FIG. 12B are diagrams illustrating a state in which pressing means according to the first embodiment presses the pendulum mechanism.
Figure 12A:
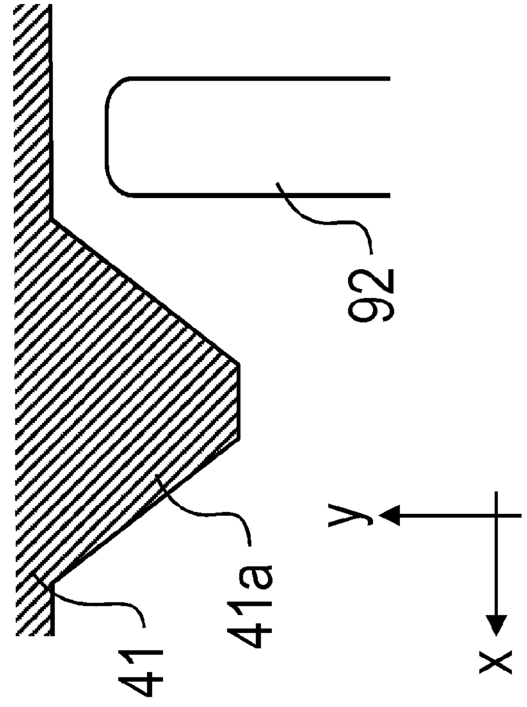

First, an operation that the regulating mechanism 90 swings from the regulating position to the non-regulating position will be explained. FIG. 12A and FIG. 12B are sectional views of the carriage 41 and the planetary-arm lock lever 92 when seen from a vertical direction (z-direction). FIG. 12A illustrates a state where the carriage 41 is at a non-pressed position, the carriage 41 is separated away from the planetary-arm lock lever 92, and the regulating mechanism 90 is at the regulating position. FIG. 12B illustrates a state where the carriage 41 is at the pressed position, the carriage 41 is in contact with the planetary-arm lock lever 92, and the regulating mechanism 90 is at the non-regulating position. The carriage 41 has a pressing portion 41*a* which protrudes in a trapezoid shape to the planetary-arm lock lever 92 side when seen from the vertical direction, and the planetary-arm lock lever 92 is brought into contact with a slope portion of the pressing portion 41*a* with movement of the carriage 41 in the scanning direction (x-direction). And when the carriage 41 further moves, the planetary-arm lock lever 92 swings while in slide contact with the pressing portion 41*a*, and when the carriage 41 moves to a predetermined drive switching position, the planetary-arm lock lever 92 is brought into a state of being pressed onto a distal end surface of the pressing portion 41*a*. When the planetary-arm lock lever 92 is pressed and swings, the planetary arm lock 91 swings in the counterclockwise direction in FIG. 11B, and the regulating mechanism 90 moves to the non-regulating position not regulating the swing of the pendulum mechanism 70. By configuring as above, the carriage 41, which is the recording means, functions as the pressing means, and there is no need to separately provide a drive source or a member for switching the position of the planetary arm lock 91. Thus, reduction of the number of the components of the image forming apparatus M, space saving, and size reduction can be realized.

Subsequently, an operation that the pendulum mechanism 70 swings from the second position to the first position will be explained. The pendulum mechanism 70 is capable of swing from the second position to the first position when the regulating mechanism 90 has moved to the non-regulating position, and the planetary arm lock 91 is in a state not regulating the swing of the planetary arm 71. As described above, the input gear 61 is connected to the conveyance roller 32 via the other members. Therefore, when the conveyance roller 32 is rotated by the drive force of the conveyance motor 31, in addition to the input gear 61, the planetary arm 71 in contact with the input gear 61 also swings. In this embodiment, when the conveyance motor 31 is driven in the first direction so that the conveyance roller 32 is rotated in a direction in which the recording medium is conveyed to the ejection roller side, the planetary arm 71 swings in a direction from the second position to the first position (counterclockwise direction in FIG. 11B). And when the pendulum mechanism 70 is located at the first position, the inter-axis distance between the planetary gear 73 and the paper-feed input gear 13 becomes the shortest distance d, and the first regulating portion 71*b* is brought into contact with a first contact portion 95*a*. That is, the paper-feed gear base 95 having the first contact portion 95*a* also functions as a first regulating member which regulates the swing of the pendulum mechanism 70. And the swing of the planetary arm 71 in the direction is regulated, and the planetary gear 73 and the paper-feed input gear 13 are engaged with each other.

FIG. 11C illustrates a state where the pendulum mechanism 70 is at the first position, and the regulating mechanism 90 is at the regulating position. Subsequently, an operation that the regulating mechanism 90 swings from the non-regulating position to the regulating position, and the image forming apparatus M changes from the state in FIG. 11B to the state in FIG. 11C will be explained.

When the carriage 41 retreats from the drive switching position, and the pressing portion 41*a* is separated from the planetary-arm lock lever 92, the planetary-arm lock lever 92 swings in the counterclockwise direction in FIG. 11C by a restoring force of a spring, not shown. That is, the planetary-arm lock lever 92 is urged to the direction by an urging member at all time. And with the swing of the planetary-arm lock lever 92, the planetary arm lock 91 swings to the regulating position, and the first holding portion 91*a* moves to a position where the swing locus of the planetary gear 73 is shut off. The first holding portion 91*a* is provided at a position where it is brought into contact with an outer diameter of the axial support portion 71*a* of the planetary gear 73 in the planetary arm 71, when the inter-axis distance between the paper-feed input gear 13 and the planetary gear 73 becomes the longest in a predetermined range. By configuring as above, the planetary arm 71 is held by the first contact portion 95*a*, the first holding portion 91*a* so that the inter-axis distance between the planetary gear 73 and the paper-feed input gear 13 is within the predetermined range, and the pendulum mechanism 70 is held at the first position. Moreover, the first holding portion 91*a* and the axial support portion 71*a* are provided on both sides in the axis direction of the planetary arm lock 91 and the planetary arm 71, and the swing of the planetary arm 71 is regulated on the both sides in the axis direction. Note that, when the pendulum mechanism 70 is at the first position, and the regulating mechanism 90 is at the regulating position, the first holding portion 91*a* does not necessarily have to be in contact with the axial support portion 71*a*, but a gap may be provided in such a range that the drive transmission from the planetary gear 73 to the paper-feed input gear 13 is not affected.

By configuring as above, the inter-axis distance between the planetary gear 73 and the paper-feed input gear 13 is guaranteed and thus, the connected state is made stable, and stable drive transmission can be realized. In particular, the planetary arm lock 91 which regulates the swing of the pendulum mechanism 70 including the planetary gear 73 swings around the rotation axis of the paper-feed input gear 13 and thus, as compared with a case where the swing axis of the regulating mechanism is not concentric with the rotation axis of the driven gear, the inter-axis distance can be guaranteed more accurately. That is because there are fewer factors such as dimensional accuracy, positional accuracy and the like of each member which would affect the inter-axis distance. Moreover, according to the present invention, even if the drive unit using the rotation in both directions, that is, the forward direction and the opposite direction of the driven gear is driven by the pendulum mechanism, the inter-axis distance between the driven gear and the drive gear is guaranteed, and the stable drive transmission can be realized.

FIG. 11D illustrates a state in which the pendulum mechanism 70 is at the second position, and the regulating mechanism 90 is at the non-regulating position. Subsequently, an operation in which the pendulum mechanism 70 swings from the first position to the second position, and the image forming apparatus M changes from the state in FIG. 11C to a state in FIG. 11D will be explained. Note that, an operation in which the planetary-arm lock lever 92 and the planetary arm lock 91 are rotated with the movement of the carriage 41, and the regulating mechanism 90 swings from the non-regulating position to the regulating position is described as above.

When the conveyance motor 31 is driven in a second direction, which is a direction opposite to the first direction, the input gear 61 and the planetary arm 71 swing clockwise in FIG. 11D, and the planetary gear 73 moves to the second position is separated away from the paper-feed input gear 13 with a predetermined distance therebetween. In this embodiment, the axial support portion 71*a* of the planetary arm 71 also functions as a second regulating portion brought into contact with the second contact portion 67*a* of the base member 67, but a regulating portion brought into contact with the second contact portion 67*a* instead of the axial support portion 71*a* may be separately provided. And when the pendulum mechanism 70 is located at the second position, the inter-axis distance between the planetary gear 73 and the paper-feed input gear 13 becomes the longest distance, and the axial support portion 71*a* is brought into contact with the second contact portion 67*a*. Then, the swing of the planetary arm 71 is regulated, and the position of the pendulum mechanism 70 is held.

Then, when the image forming apparatus M changes from the state in FIG. 11D to the state in FIG. 11A, an operation in which the regulating mechanism 90 moves from the non-regulating position to the regulating position is as described above. By means of the movement of the regulating mechanism 90 to the regulating position, the planetary arm 71 is held by the second contact portion 67*a* and the second holding portion 91*b* so that the inter-axis distance between the planetary gear 73 and the paper-feed input gear 13 is within the predetermined range, and the pendulum mechanism 70 is held at the second position.

As described above, according to this embodiment, the inter-axis distance between the planetary gear of the pendulum mechanism and the subsequent-stage gear connected to the planetary gear is held with accuracy, and unintended disconnection of the connected state is suppressed, whereby stable drive transmission can be realized.

Second Embodiment

Figure 13:
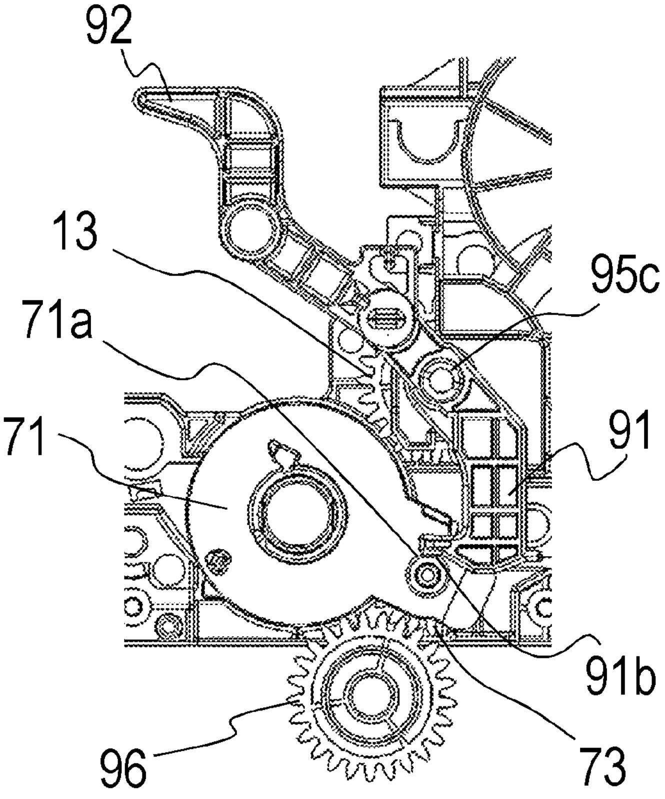
FIG. 13 is a side view illustrating the pendulum mechanism and a driven portion according to a second embodiment.

With reference to FIG. 13, a second embodiment of the present invention will be explained. The second embodiment is different from the first embodiment in a point that the planetary gear 73 can transmit the drive force to those other than the paper feed portion 1 and has a plurality of driven portions. Hereinafter, in the explanation of the second embodiment, explanation will be omitted for configurations similar to those in the first embodiment, but only featured configurations of the second embodiment will be explained.

FIG. 13 is a view of the pendulum mechanism 70 and the regulating mechanism 90 in this embodiment when seen from a swing center direction of the planetary arm 71 and illustrates a state in which the planetary gear 73 is connected to a recovery input gear 96. The planetary gear 73 in this embodiment is connected to the recovery input gear 96 when the pendulum mechanism 70 is at the second position. The recovery input gear 96 is axially supported by the shaft portion, not shown, provided on the base member 67. The recovery input gear 96 is an end gear which transmits drive to a recovery unit which holds a surface state of a recording-head liquid ejection portion in a favorable state via a drive train, not shown.

When the pendulum mechanism 70 is at the second position, the planetary gear 73 is separated away from the paper-feed input gear 13 with a predetermined distance, and the drive force is transmitted from the planetary gear 73 only to the recovery input gear 96. At this time, the swing locus of the planetary arm 71 is shut off by the second holding portion 91*b* of the planetary arm lock 91, and the position of the pendulum mechanism 70 is regulated so that the inter-axis distance between the planetary gear 73 and the recovery input gear 96 does not deviate from the predetermined range. That is, even if a force acts on the planetary gear 73 in a direction in which the planetary gear 73 is separated away from the recovery input gear 96, the axial support portion 71*a* is brought into contact with the second holding portion 91*b*, and the swing of the planetary arm 71 is regulated and thus, disconnection between the planetary gear 73 and the recovery input gear 96 can be prevented.

Note that, this embodiment is configured such that the drive force can be selectively transmitted by the pendulum mechanism to each of a first driven portion as the paper feed portion and a second driven portion as a recovery unit, but in application of the present invention, a transmission destination of the drive force may be other units.

Working Effects of the Present Invention

Working effects obtained by the configurations described above will be explained in more detail. The planetary arm lock 91 is configured capable of swing around the rotation axis of the paper-feed input gear 13. And when the pendulum mechanism 70 is at the first position, the planetary arm lock 91 regulates the swing of the planetary arm 71 in the direction in which the planetary gear 73 is separated away from the paper-feed input gear 13 by the first holding portion 91*a*. By means of this configuration, even if a force acts on the planetary gear 73 in the direction separated away from the paper-feed input gear 13 or if the pendulum mechanism 70 swings in the direction in which the planetary gear 73 is separated away from the paper-feed input gear 13, variation in the inter-axis distance between the planetary gear 73 and the paper-feed input gear 13 can be kept small. In particular, as compared with a configuration in which the swing axis of the planetary arm lock 91 and the rotation axis of the paper-feed input gear 13 are not concentric, the inter-axis distance can be guaranteed with accuracy and thus, the connected state between the planetary gear 73 and the paper-feed input gear 13 is made stable, and the stable drive transmission can be realized.

Moreover, when the pendulum mechanism 70 is at the second position, the planetary arm lock 91 regulates the swing of the planetary arm 71 in a direction in which the planetary gear 73 approaches the paper-feed input gear 13 by the second holding portion 91*b*. By means of this configuration, in the state in which the planetary gear 73 is not connected to the paper-feed input gear 13, even if the force in the direction approaching the paper-feed input gear 13 acts on the planetary gear 73, the drive disconnected state is stably held. Moreover, since unintentional approach of the planetary gear 73 to the paper-feed input gear 13 can be prevented, the inter-axis distance of the planetary gear 73 from the paper-feed input gear 13 can be kept small. And as compared with the configuration in which the swing axis of the planetary arm lock 91 and the rotation axis of the paper-feed input gear 13 are not concentric, the inter-axis distance can be guaranteed with accuracy. Thus, since there is no need to largely separate the planetary gear 73 away from the paper-feed input gear 13, the swing range of the planetary arm 71 can be set small, and size reduction of the drive switching portion can be realized.

Moreover, as shown in the second embodiment, the inter-axis distance between the planetary gear 73 and the recovery input gear 96 can be guaranteed with accuracy even in the configuration in which there are two drive transmission destinations for the drive switching portion, the connected state between the planetary gear 73 and the recovery input gear 96 is made stable, and stable drive transmission can be realized.

Furthermore, the pendulum mechanism 70 of this embodiment is a pendulum mechanism constituted by two gears, that is, the sun gear 72 and the planetary gear 73. Therefore, since the pendulum mechanism is constituted by the minimum number of gears, according to the present invention, lowering of transmission efficiency of the drive can be suppressed, distortion of the planetary arm 71 is suppressed, and more stable drive transmission can be realized.

Moreover, in the embodiment described above, when the planetary gear 73 is connected to the paper-feed input gear 13, a straight line connecting the rotation center of the planetary gear 73 and the rotation center of the paper-feed input gear 13 and a straight line connecting the swing center of the planetary arm 71 and the rotation center of the planetary gear 73 are orthogonal to each other. By configuring as above, an extending direction of the straight line connecting the rotation center of the planetary gear 73 and the rotation center of the paper-feed input gear 13 and the swing direction of the planetary gear 73 are matched, and a variation suppression effect of the inter-axis distance between the planetary gear 73 and the paper-feed input gear 13 by the planetary arm lock 91 is improved.

Moreover, in the embodiment described above, the axial support portion 71*a* which supports the planetary gear 73 and functions also as a regulated portion is brought into contact with the first holding portion 91*a*, which is a regulating portion of the planetary arm lock 91, and the swing of pendulum mechanism 70 is regulated. By configuring as above, as compared with a configuration in which the regulated portion is provided at a position away from the planetary gear 73, variation in the inter-axis distance between the planetary gear 73 and the paper-feed input gear 13 can be kept small, and the stable drive transmission to the paper-feed input gear 13 can be realized.

Moreover, in the embodiment described above, the first holding portion 91*a* which shuts off the swing locus of the planetary arm 71 is provided on both sides in the rotation axis direction of the planetary gear 73. Therefore, distortion and inclination of the planetary arm 71 can be suppressed, and the variation in the inter-axis distance can be suppressed and thus, the stable drive transmission can be realized.

Furthermore, regarding the planetary arm 71, when the pendulum mechanism 70 is at the first position, the swing in the direction in which the planetary gear 73 approaches the paper-feed input gear 13 is regulated by the first contact portion 95*a* of the paper-feed gear base 95. By configuring as above, excessive reduction of the inter-axis distance between the planetary gear 73 and the paper-feed input gear 13 is suppressed, and biting of the planetary gear 73 into the paper-feed input gear 13 can be prevented. Similarly, regarding the planetary arm 71, when the pendulum mechanism 70 is at the second position, the swing in the direction in which the planetary gear 73 approaches the recovery input gear 96 is regulated by the second contact portion 67*a* of the base member 67. By configuring as above, the excessive reduction of the inter-axis distance between the planetary gear 73 and the recovery input gear 96 is suppressed, and the biting of the planetary gear 73 into the recovery input gear 96 can be prevented. Thus, a rise in a drive load can be suppressed, and stable drive transmission can be realized.

As described above, according to the present invention, even in the configuration in which the drive force is selectively transmitted by the drive gear (planetary gear) of the pendulum mechanism, the inter-axis distance between the drive gear and the driven gear can be guaranteed with accuracy and thus, the stable drive transmission can be realized. The present invention is particularly effective in a configuration in which the drive source is rotated in both forward and reverse directions, and a force acts on the drive gear in the direction separated away from the driven gear, since the stable drive transmission can be realized regardless of the rotating direction of the drive source.

Moreover, in the embodiment described above, by causing the pressing portion 41*a* provided on the carriage 41 to be brought into contact with a distal end portion of the planetary-arm lock lever 92 and to swing, the position of the planetary arm lock 91 connected to the planetary-arm lock lever 92 is indirectly switched. By configuring as above, since there is no need to separately provide a drive source for switching the position of the planetary arm lock 91, reduction in the number of components of the image forming apparatus M, space saving, and size reduction can be realized.

Furthermore, in the embodiment described above, the swing axis of each of the planetary arm 71 and the drive member 82 is constituted so as to be coaxial with the rotation axis of the input gear 61. By configuring as above, there is no need to provide individual input gears for the respective drive portions, and reduction in the number of components of the image forming apparatus M, space saving, and size reduction can be realized.

Furthermore, in the embodiment described above, since the input gear 61 has both sides in the axis direction thereof axially supported by the fitting holes 67*d*, 68*e*, variation in the inter-axis distance with a coupled component due to falling of the axis can be suppressed, and the stable drive transmission can be realized. Furthermore, since the planetary arm 71 and the sun gear 72 are held by the input gear 61 between the base member 67 and the cover member 68, the variation in the inter-axis distance with a coupled component due to falling of the axis can be suppressed similarly to the input gear 61, and stable drive switching and drive transmission can be realized.

Furthermore, in the embodiment described above, the drive member 82 includes a cylindrical shaft portion, which is a rotation shaft portion, and is held by the input gear 61 by the shaft portion being inserted into the inner diameter side of the cylindrical shaft portion of the input gear 61. By configuring as above, since the drive member 82 can be axially supported at a shaft axial support position of the input gear 61 by the base member 67, the axial support state of the drive member 82 is made stable, and the stable drive transmission to the drive member 82 can be realized.

Furthermore, in the embodiment described above, the rotation axis of the roller holder 51 is configured to be coaxial with the rotation axis of the input gear 61. By configuring as above, there is no need to provide individual input gears for the respective drive portions, and reduction in the number of components of the image forming apparatus M, space saving, and size reduction can be realized.

In the image forming apparatus M according to the embodiment described above, the lock mechanism for regulating the movement of the carriage 41 was provided. In the image forming apparatus M as above, if the lock mechanism unintentionally retreats from above the scanning path of the recording means by an impact of the falling or the like during transportation, for example, the recording means becomes movable in the scanning direction, and the capping state of the liquid ejection head cannot be held anymore. Thus, subsequently, a recording device including a lock mechanism which can enter onto the scanning path of the recording means and retreat from above the scanning path, that is, a lock mechanism held at a certain position even if it receives an external force will be explained.

Third Embodiment

Image Forming Apparatus

Figure 14:
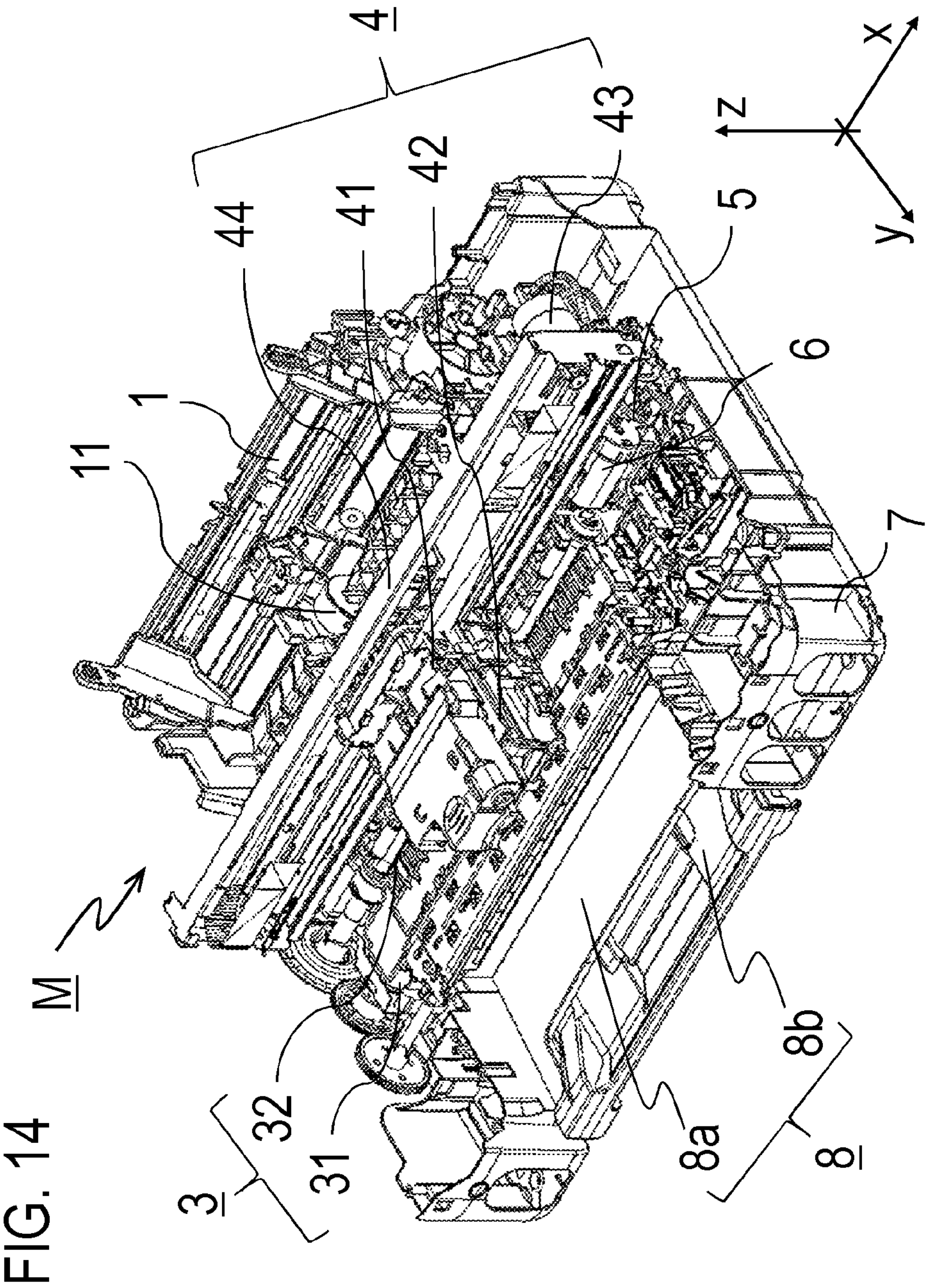
FIG. 14 is a perspective view illustrating an internal configuration of an image recording device according to a third embodiment.

FIG. 14 is a perspective view illustrating an internal configuration of the image forming apparatus M, which is a recording device according to a third embodiment of the present invention. In the following explanation, as shown in FIG. 14, the explanation will be made by assuming that a direction from a left side surface to a right side surface of the image forming apparatus M is an x-direction, a direction from a rear surface to a front surface of the image forming apparatus M is a y-direction, and a direction vertically upward is a z-direction. In this embodiment, a width direction of a recording medium conveyed inside the image forming apparatus M is substantially in parallel with the x-direction, and a conveying direction of the recording medium is substantially in parallel with the y-direction.

The image forming apparatus M is a multifunctional machine including a print portion and a scanner portion (not shown) disposed on the print portion and can execute various types of processing related to an image recording operation and a reading operation by the print portion and the scanner portion individually or interlockingly. The scanner portion includes an ADF (Auto Document Feeder) and an FBS (Flat Bed Scanner) and is capable of reading of a manuscript automatically fed by the ADF and reading of the manuscript placed by a user on a manuscript table of the FBS. Note that, though this embodiment is the multifunctional machine having both the print portion and the scanner portion, the present invention can be applied to an image forming apparatus such as a printer and the like not including the scanner portion.

The print portion of the image forming apparatus M includes the paper feed portion 1 on which the recording medium is loaded, the conveying portion 3 which conveys the recording medium fed from the paper feed portion 1, and the recording portion 4 as the recording means which records an image on the recording medium conveyed from the conveying portion 3. Moreover, the print portion includes the paper ejection portion 8 on which the recording medium with the image recorded is ejected and loaded, the maintenance portion 5 which performs maintenance of the recording head 42 of the recording portion 4, and the drive portion 6 which transmits drive of the conveyance motor 31 of the conveying portion 3 to the paper feed portion 1 and the maintenance portion 5.

The paper feed portion 1 includes the paper feed roller 11 and conveys the loaded recording medium by the paper feed roller 11 to the conveying portion 3. The conveying portion 3 includes the conveyance motor 31, which is a drive source and is capable of forward/reverse rotation and the conveyance roller 32 driven by the conveyance motor 31 and conveys the recording medium by the conveyance roller 32 to a region where recording by the recording portion 4 is performed.

The recording portion 4 is the recording means including the carriage 41, the recording head 42 held by the carriage 41, the carriage motor 43 which drives the carriage 41, and the chassis 44 which holds the carriage 41 and guides the movement thereof. The recording portion 4 performs the recording operation by ejecting a liquid such as ink or the like by the recording head 42 to the recording medium conveyed from the conveying portion 3 located closer to the upstream side than the recording portion 4 in the conveying direction of the recording medium. In this embodiment, the liquid ejection direction of the recording head 42 as a liquid ejection head is substantially parallel with the vertical direction (z-direction). The carriage 41 is capable of reciprocating movement on the scanning path along the chassis 44 extending from one end portion to the other end portion in the x-direction in the image forming apparatus M. In the recording operation on the recording medium, the recording head 42 ejects the liquid toward the recording medium while moving in the x-direction integrally with the carriage 41.

The paper ejection portion 8 includes the loading portion 8*a* on which the recoding medium is loaded and the extension tray 8*b* which can be withdrawn with respect to the image forming apparatus M so that the recording medium can be supported if a size of the recording medium is large in the y-direction.

The maintenance portion 5 includes a mechanism which brings a suction cap into contact with the recording head 42 and a suctioning mechanism which suctions ink from an ink ejection port of the recording head 42 by a tube pump. Moreover, the image forming apparatus M has a lock mechanism 60 for locking the carriage 41 at a position where the suction cap is brought into contact with the recording head 42 provided. The lock mechanism 60 stably holds a cap state of the recording head 42 and regulates movement of the carriage 41 during the physical-distribution conveyance. Details of a configuration for holding the position of the carriage 41 by the lock mechanism 60 will be described later.

The aforementioned units constituting the print portion are all fastened to the main-body base 7. Moreover, a circuit board (not shown) which controls operations of these units are positioned and held on the main-body base 7 and the chassis 44.

Print Operation

Figure 15:
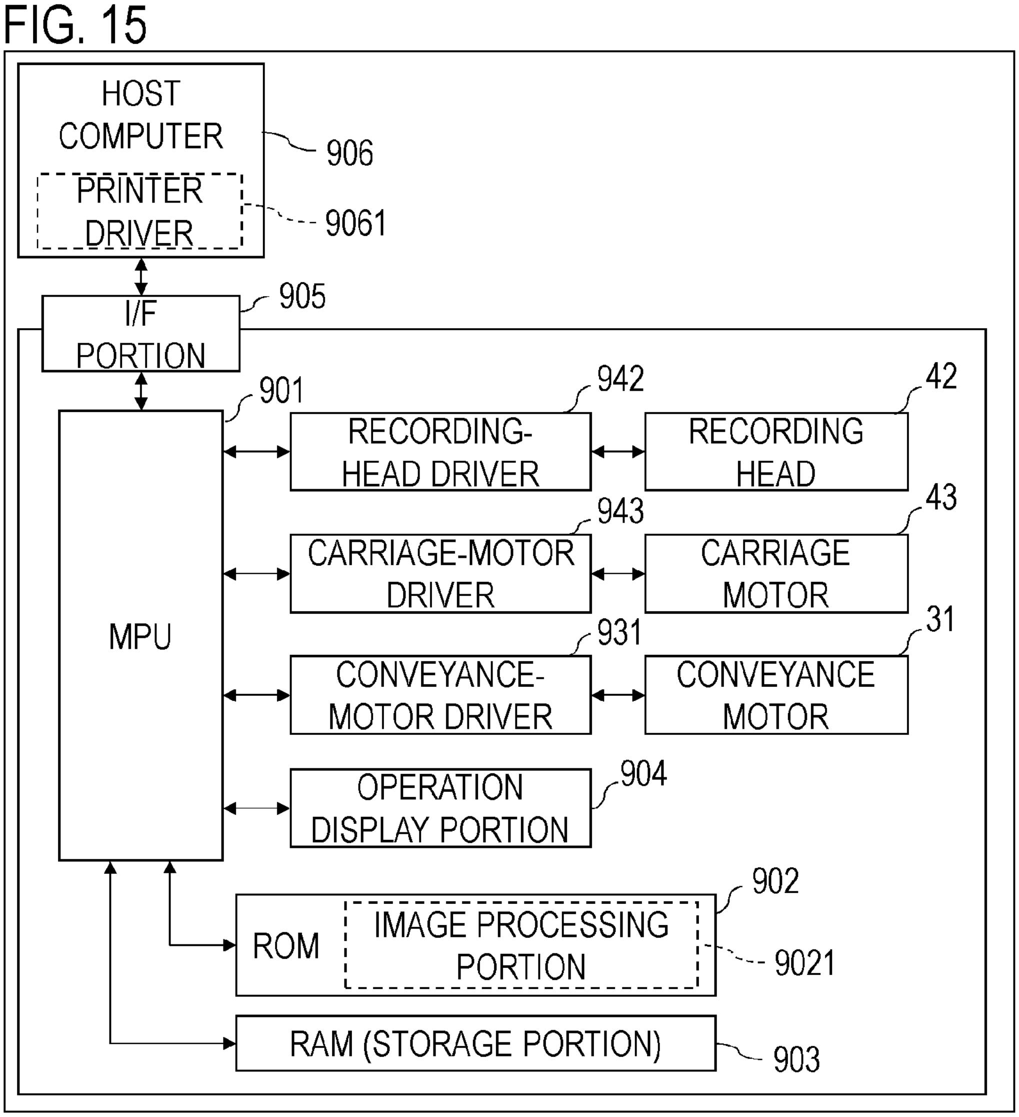
FIG. 15 is a block diagram of the image recording device according to the third embodiment.

FIG. 15 is a block diagram of the image forming apparatus M in this embodiment. The image forming apparatus M includes the MPU 901, the ROM 902, and the RAM 903. The MPU 901 is an MPU which controls operations of each portion, data processing and the like. The ROM 902 is a ROM which stores programs and data executed by the MPU 901 and includes the image processing portion 9021. The RAM 903 is a RAM which temporarily stores processing data executed by the MPU 901 and data received from the host computer 906.

The image forming apparatus M further includes the recording-head driver 942 which controls the recording head 42, the carriage-motor driver 943 which controls the carriage motor 43, and the conveyance-motor driver 931 which controls the conveyance motor 31. The MPU 901 controls the operation display portion 904 in addition to the recording-head driver 942, the carriage-motor driver 943, and the conveyance-motor driver 931. Moreover, the carriage 41 is driven by the carriage motor 43, and the paper feed roller 11, the conveyance roller 32, and the ejection roller are driven by the conveyance motor 31.

The host computer 906 has the printer driver 9061 which processes recording information such a recorded image, an image grade and the like and communicates with the image forming apparatus when execution of the recording operation is ordered by a user. The MPU 901 exchanges recorded images and the like with the host computer 906 via an OF portion 905.

Drive Portion

Figure 16:
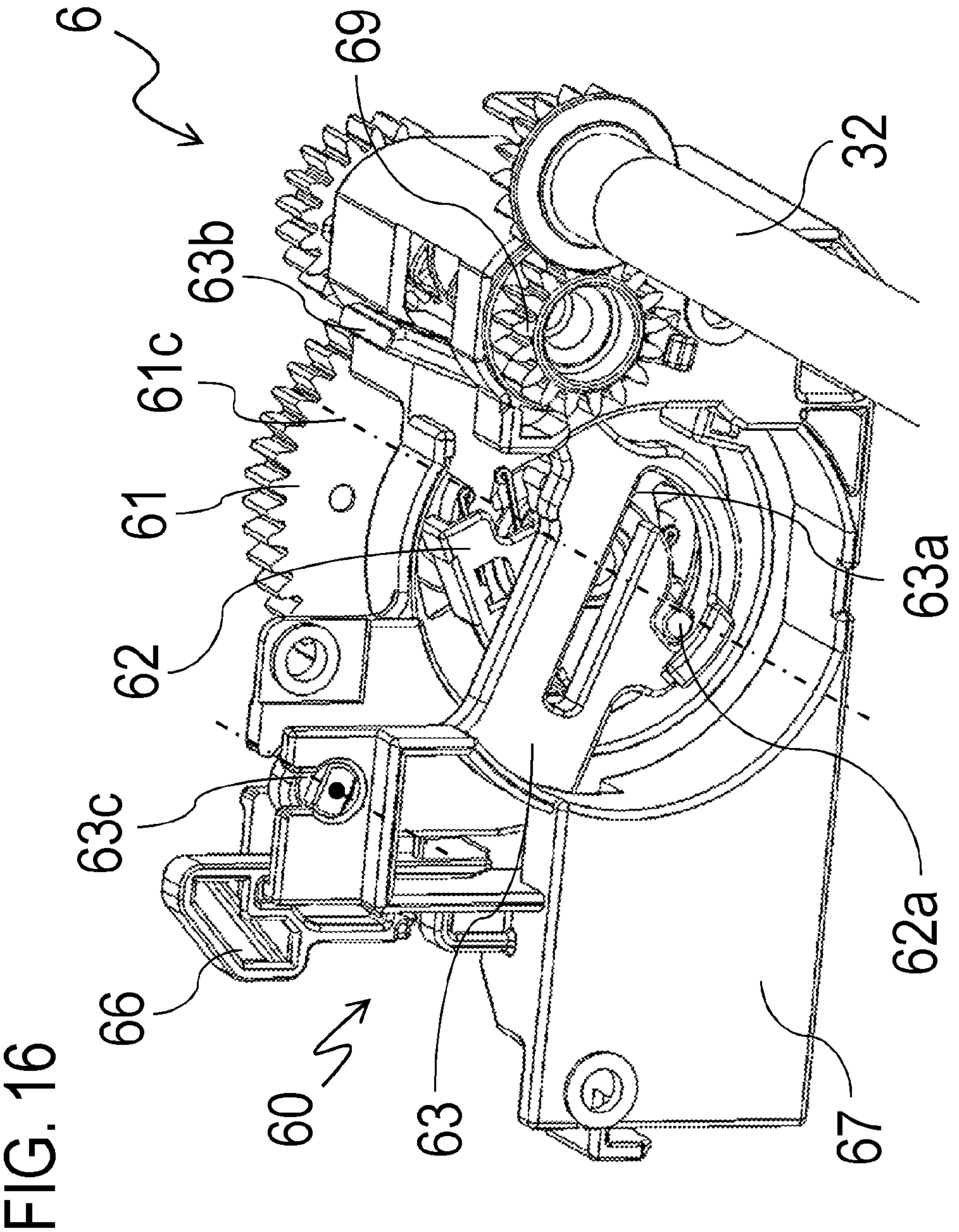
FIG. 16 is a perspective view of a drive portion according to the third embodiment.
Figure 17:
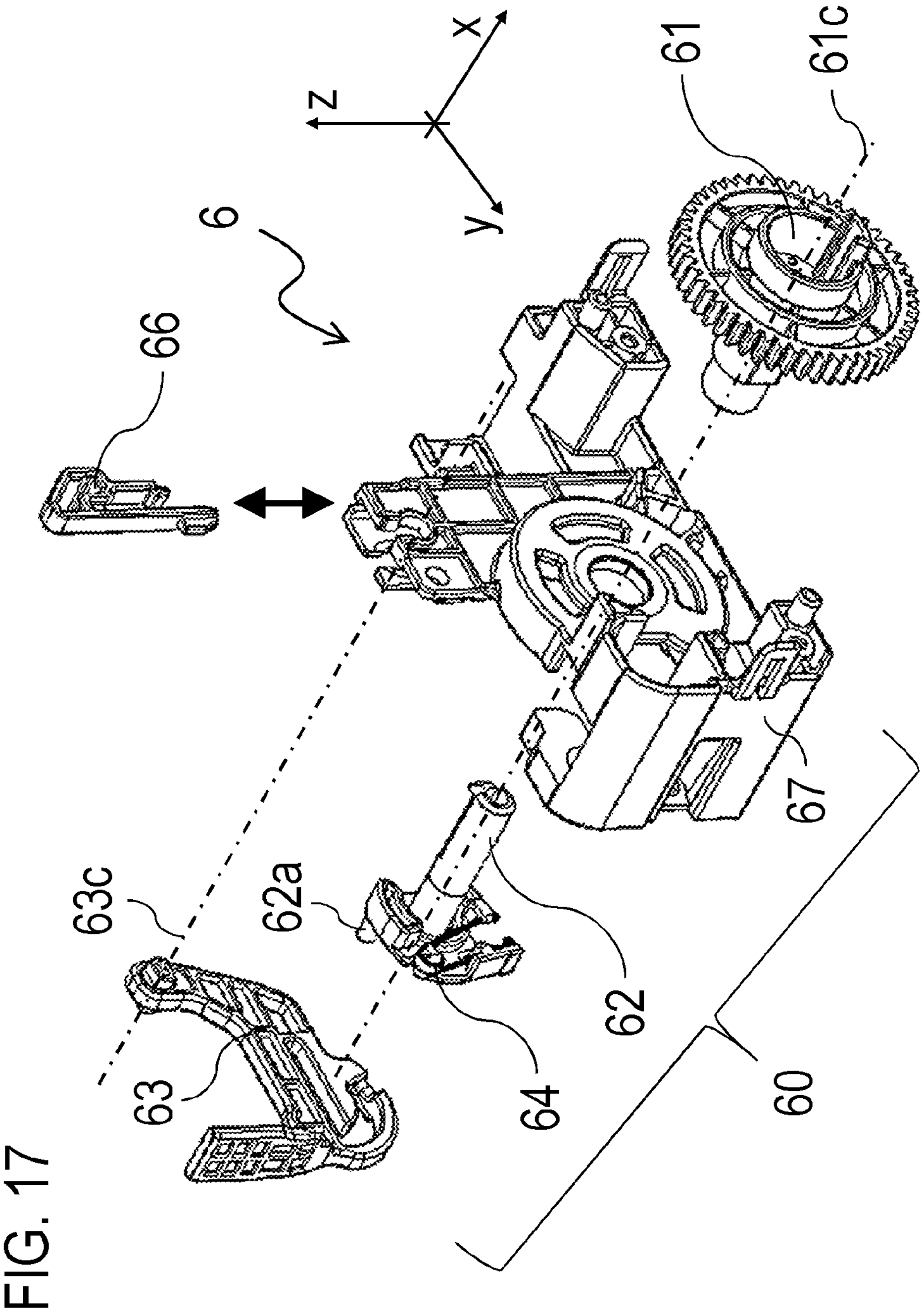
FIG. 17 is an exploded perspective view of a lock mechanism according to the third embodiment.
Figure 18B:
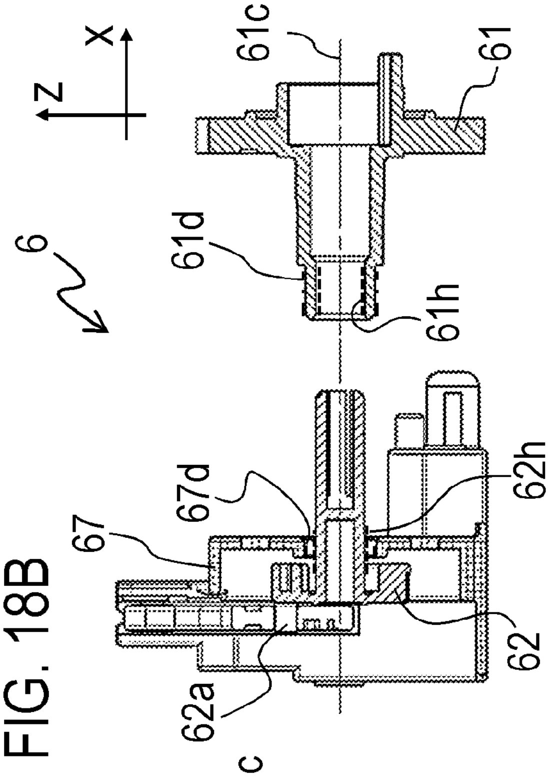
FIG. 18A and FIG. 18B are sectional views of the lock mechanism according to the third embodiment.
Figure 18A:
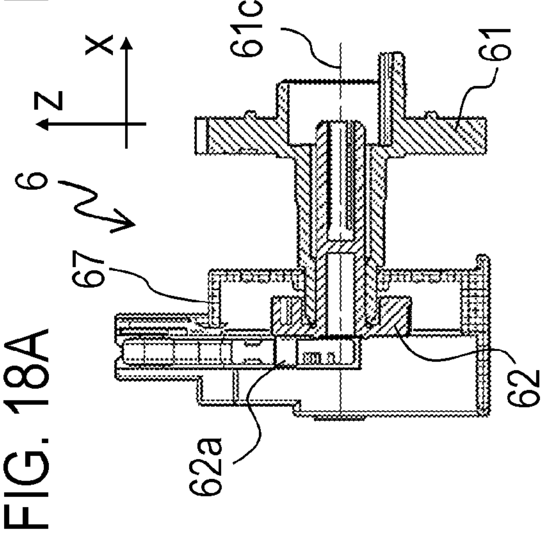

Subsequently, with reference to FIG. 16, FIG. 17, FIG. 18A, FIG. 18B, a configuration of the drive portion 6 of the third embodiment will be explained. FIG. 16 is a perspective view of the drive portion 6 driven by the conveyance motor 31, which is a drive source. FIG. 17 is an exploded perspective view of the drive portion 6. FIG. 18A is a sectional view of the drive portion 6, and FIG. 18B is a sectional view illustrating a fitting configuration of the drive portion 6.

The drive portion 6 has the input gear 61 and the lock mechanism 60 driven by the input gear 61. The input gear 61 is coupled with the conveyance motor 31 via the drive train, not shown, the conveyance roller 32, and the idler gear 69 and is rotated by transmission of the drive force of the conveyance motor 31. The lock mechanism 60 has a drive member 62, a lever member 63, a swing regulating member 66, and the base member 67.

The drive member 62 is a rotating member which rotates concentrically with the input gear 61 around the rotation axis 61*c* by transmission of the drive force from the input gear 61. The drive member 62 has a link portion 62*a* extending in a columnar shape in parallel with the rotation axis 61*c* at a position different from that of the rotation axis 61*c*. When the drive member 62 is rotated, the link portion 62*a* performs a circular motion around the rotation axis 61*c*. In other words, the input gear 61 is a drive transmitting member which transmits the drive force of the conveyance motor 31 to the drive member 62 and concentrically rotates and drives the drive member 62.

The lever member 63 is a swing member which is supported by the base member 67 swingably around a swing axis 63*c* extending in parallel with the rotation axis 61*c* at a position different from that of the rotation axis 61*c*. The lever member 63 has a cam surface 63*a* pressed by the link portion 62*a* and an engaging portion 63*b* which regulates scanning of the carriage 41. When the link portion 62*a* presses the cam surface 63*a* while sliding on the cam surface 63*a* with the rotation of the drive member 62, the lever member 63 swings around the swing axis 63*c* while being regulated by the link portion 62*a*. In this embodiment, by causing the lever member 63 to swing so as to change an attitude of the lever member 63, the engaging portion 63*b* enters onto the scanning path of the carriage 41 or retreats from above the scanning path.

The input gear 61 has a cylindrical shaft portion extending with the rotation axis 61*c* as the center, and an outer peripheral surface and an inner peripheral surface of the shaft portion function as a fitting shaft 61*d* and a fitting hole 61*h* for fitting with each component of the drive portion 6. A sectional shape of the fitting portion of each of the input gears 61 is circular with the rotation axis 61*c* of the input gear 61 as the center. Moreover, the drive member 62 has a cylindrical shaft portion extending with the rotation axis 61*c* as the center, and an outer peripheral surface of the shaft portion functions as a fitting shaft 62*h* to be fitted with the fitting hole 61*h* of the input gear 61.

The base member 67 is a support member which supports the components of the drive portion 6 and is mounted to the main-body base 7 explained in FIG. 14. Moreover, the base member 67 has the fitting hole 67*d* (an axial support portion) which is fitted with the fitting shaft 61*d* of the input gear 61. The input gear 61 is rotatably and axially supported by the base member 67 with the fitting shaft 61*d* being inserted into the fitting hole 67*d*. The drive member 62 is a rotating member rotatably and axially supported by the input gear 61 with the fitting shaft 62*h* being inserted into the fitting hole 61*h*, which is an inner peripheral surface of the cylinder portion of the input gear 61.

Moreover, in the lock mechanism 60, friction means 64 which urges the fitting hole 61*h* to a direction in which it is pressed onto the fitting shaft 62*h* is provided. When the fitting shaft 62*h* is brought into contact with the fitting hole 61*h* by the friction means 64, the drive member 62 has the drive force transmitted from the input gear 61 and rotates. The friction means 64 in this embodiment is a spring member which urges the input gear 61 and the drive member 62 to each other. Note that, the friction means 64 is not limited to an urging member such as a spring but a viscous substance such as grease may be used. By applying the viscous substance such as the grease between the fitting hole 61*h* and the fitting shaft 62*h*, a frictional force becomes larger, and the drive member 62 also rotates with the rotation of the input gear 61.

Carriage Lock Method

Subsequently, with reference to FIG. 19A to FIG. 19D, a lock method for locking the carriage 41 on which the recording head 42 is mounted at a capping position by the lock mechanism 60 in this embodiment will be explained.

Figure 19A:
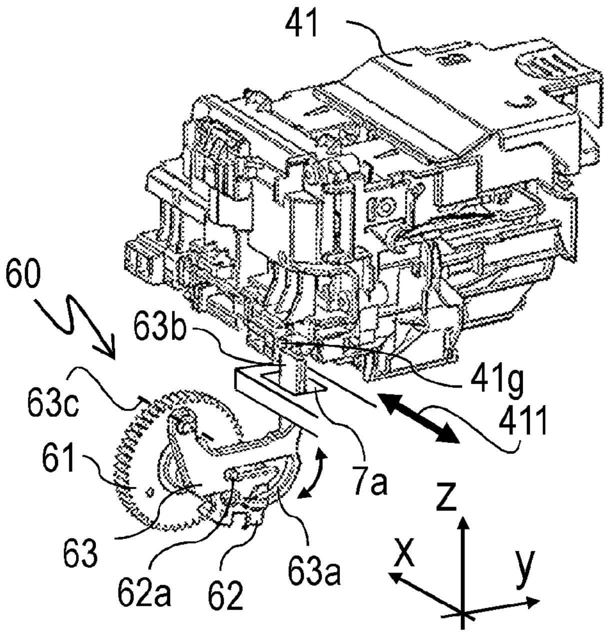
FIG. 19A to FIG. 19D are diagrams illustrating a positional relationship between a carriage and the lock mechanism according to the third embodiment.
Figure 19B:
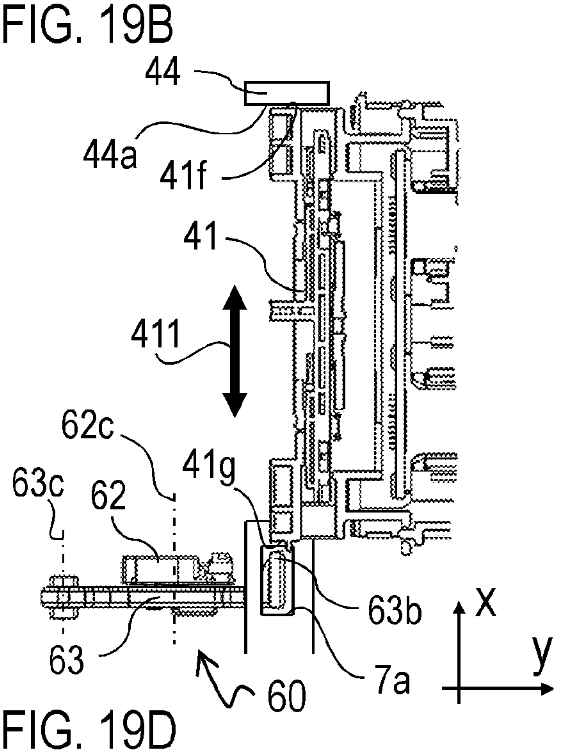
Figure 19C:
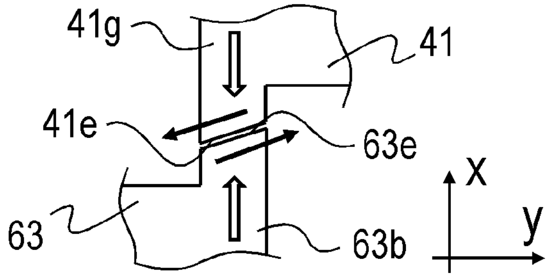
Figure 19D:
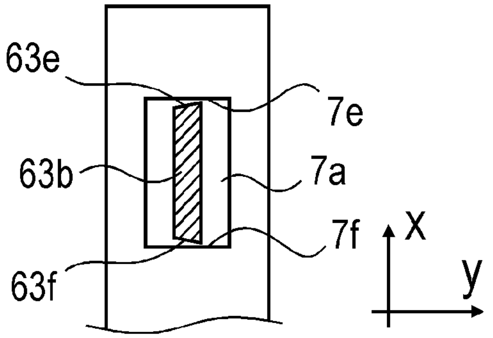

FIG. 19A is a perspective view illustrating a positional relationship between the carriage 41 and the lock mechanism 60. FIG. 19B is a top view illustrating a positional relationship between the carriage 41 and the lock mechanism 60. FIG. 19C is a schematic top view illustrating an engaged spot between the carriage 41 and the lock mechanism 60 in an enlarged manner. FIG. 19D is a schematic top view illustrating a positional relationship between the lock mechanism 60 and an opening portion 7*a* of the main-body base 7.

The carriage 41 has the contact portion 41*f* opposing the chassis end portion 44*a*, when the lock mechanism 60 is at a position for regulating the scanning of the carriage 41 and an engaged portion 41*g* opposing the lock mechanism 60. When the recording operation is being performed on the recording medium, the carriage 41 performs scanning in a scanning direction 411 indicated by an arrow in FIG. 19A, FIG. 19B. On the other hand, during the physical distribution or the like, in order to prevent unintended movement of the carriage 41, the carriage 41 is locked by the lock mechanism 60 at the capping position, and the movement thereof is regulated.

When the scanning of the carriage 41 is regulated by the lock mechanism 60, as shown in FIG. 19A, FIG. 19B, the engaging portion 63*b*, which is a lock portion at a distal end of the lever member 63, is located on the scanning path of the carriage 41. As described above, the position of the lever member 63 when the engaging portion 63*b* of the lever member 63 is opposed to the engaged portion 41*g* of the carriage 41, and the engaging portion 63*b* regulates the movement of the carriage 41 in the scanning direction 411 is referred to as an operating position. Moreover, the engaging portion 63*b* retreats from above the scanning path of the carriage 41 and does not regulate the scanning of the carriage 41.

As described above, the conveyance roller 32 driven by the conveyance motor 31 is transmitted to the drive member 62 via the idler gear 69 and the input gear 61. When the conveyance roller 32 is driven in the forward direction (direction in which the recording medium is conveyed to the ejection roller side), the lever member 63 swings around the swing axis 63*c*, and the engaging portion 63*b* moves to the non-operating position (retreated side) where the scanning path of the carriage 41 is not shut off. At this time, the lever member 63 is brought into the non-operating state in which the engagement with the carriage 41 is released, and the reciprocating movement of the carriage 41 in the scanning direction 411 is not regulated.

On the other hand, when the conveyance roller 32 is driven in the reverse direction (direction opposite to the forward direction), the lever member 63 swings around the swing axis 63*c*. Then, the lever member 63 moves to the operating position where the carriage 41 is locked, and the engaging portion 63*b* of the lever member 63 shuts off the scanning path of the carriage 41. At this time, the carriage 41 is shut off on one side in the scanning direction 411 by the chassis end portion 44*a* and the other side by the engaging portion 63*b*, and the movement from that position is regulated. That is, when the carriage 41 is located on an end portion on one end side of the chassis 44 in the scanning direction 411, the carriage 41 is sandwiched by the chassis end portion 44*a* of the chassis 44 and the engaging portion 63*b* of the lever member 63.

By configuring as above, even if a force is applied to the carriage 41, the contact portion 41*f* provided on the one end portion in the scanning direction 411 of the carriage 41 is brought into contact with the chassis end portion 44*a* of the chassis 44, and the movement of the carriage 41 is regulated. Similarly, the engaged portion 41*g* provided on the other end portion on the side opposite to the one end portion on which the contact portion 41*f* of the carriage 41 is provided is brought into contact with the engaging portion 63*b* of the lever member 63, and the movement of the carriage 41 is regulated. That is, the carriage 41 has the movement in the scanning direction 411 regulated at the capping position, and the position is fixed.

Moreover, the engaged portion 41*g* of the carriage 41 has a first slope portion 41*e*, and the engaging portion 63*b* of the lever member 63 has a second slope portion 63*e*. As shown in FIG. 19C, the first slope portion 41*e* and the second slope portion 63*e* are inclined with respect to a plane orthogonal to the scanning direction 411, when seen from the vertical direction (z-direction). When the lock mechanism 60 is at the operating position, if the carriage 41 moves so as to approach the lever member 63 along the scanning direction 411, the first slope portion 41*e* presses the second slope portion 63*e*. The first slope portion 41*e* and the second slope portion 63*e* are surfaces inclined to a surface orthogonal to the scanning direction 411 in which the carriage 41 performs scanning, respectively. The first slope portion 41*e* and the second slope portion 63*e* are inclined so that pressing force by which the carriage 41 presses the lever member 63 acts in the direction to draw the lever member 63 to the carriage 41 in the y-direction orthogonal to the scanning direction 411. That is, in the scanning direction 411, the more the carriage 41 is pressed to the lever member 63, the stronger the force by which the carriage 41 and the lever member 63 draw each other becomes and thus, engagement between the carriage 41 and the lever member 63 is hard to be released.

Moreover, when the lock mechanism 60 is at the operating position, the engaging portion 63*b* is inserted into the opening portion 7*a* formed in the main-body base 7. And as shown in FIG. 19D, an inner peripheral surface 7*e* of the opening portion 7*a* is opposed to the second slope portion 63*e* of the engaging portion 63*b*, and an inner peripheral surface 7*f* of the opening portion 7*a* is opposed to an end portion 63*f* on the side opposite to the second slope portion 63*e* of the engaging portion 63*b*. By configuring as above, even if the engaging portion 63*b* receives a force and is deformed, the second slope portion 63*e* is brought into contact with the inner peripheral surface 7*e*, or the end portion 63*f* is brought into contact with the inner peripheral surface 7*f* and thus, the position of the engaging portion 63*b* is hard to be varied. Thus, the carriage 41 is locked at the capping position reliably.

By means of the lock method described above, the carriage 41 can be regulated at the predetermined position. Thus, during transport or the like, movement of the carriage 41 from the capping position by an unintended impact can be regulated, and damage of the carriage 41 or removal of the suction cap from the recording head 42 can be prevented.

Operation of Lock Mechanism

Figures 20A, 20B, 20C, 20D:
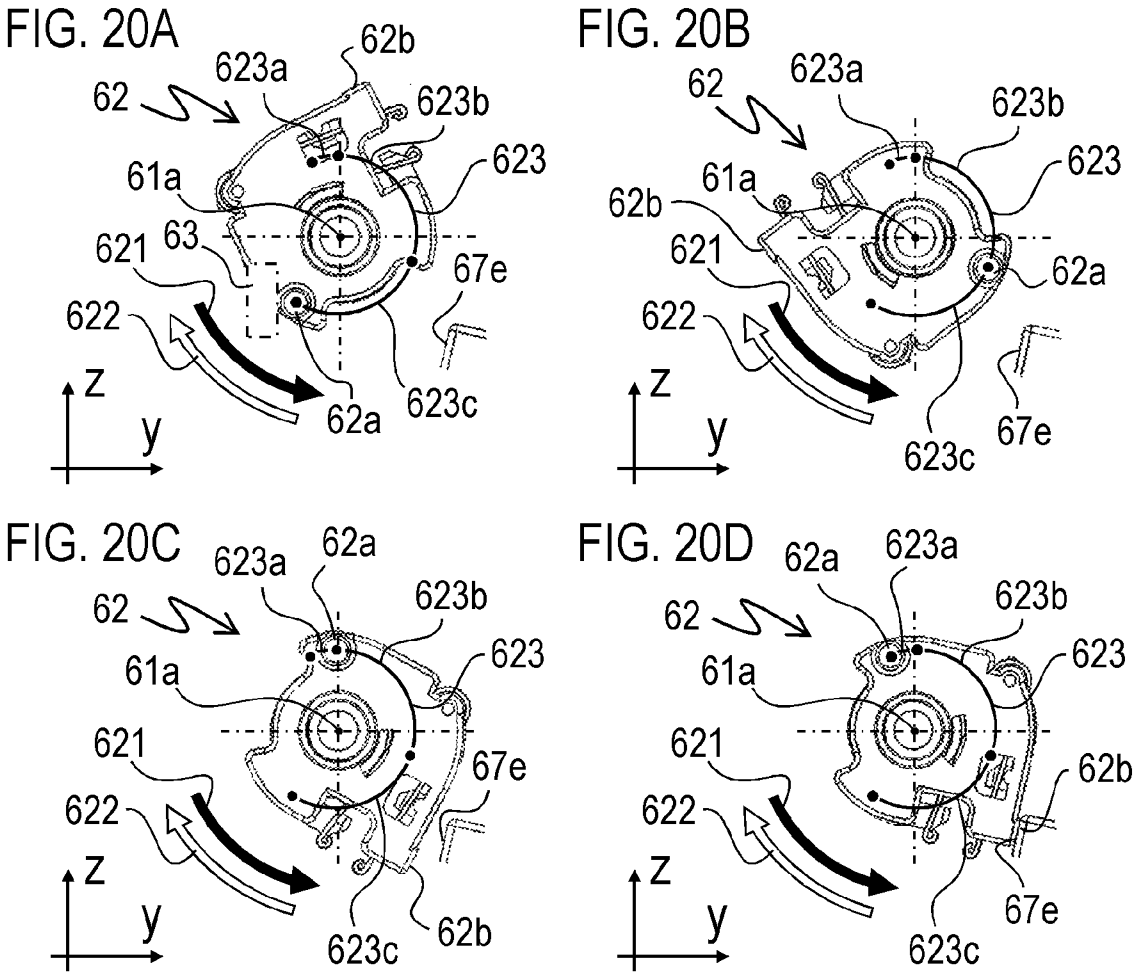
FIG. 20A to FIG. 20D are side views illustrating an operation of a drive member according to the third embodiment.
Figure 21A:
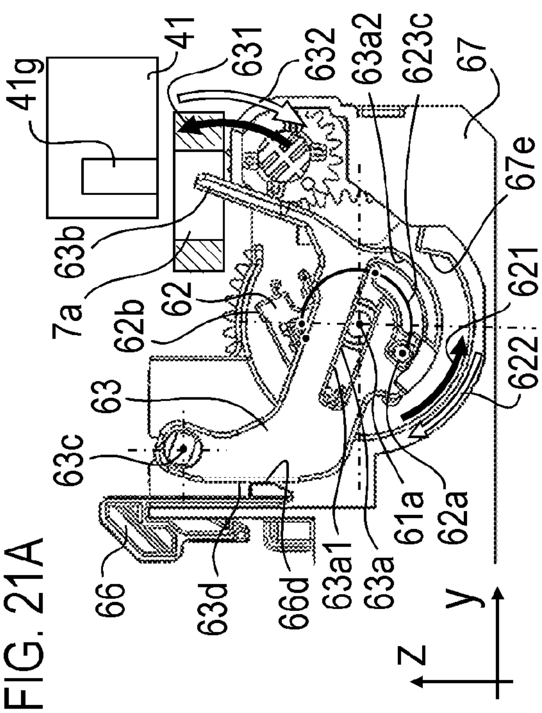
FIG. 21A to FIG. 21D are side views illustrating an operation of the lock mechanism according to the third embodiment.

Subsequently, an attitude and an operation of the lock mechanism 60 will be explained by referring to FIG. 20A to FIG. 20D, FIG. 21A to FIG. 21D. FIG. 20A to FIG. 20D are side views illustrating the operation of the drive member 62, and FIG. 21A to FIG. 21D are side views illustrating the operation of the lever member 63 interlocking with the drive member 62. In FIG. 20A and FIG. 21A, the attitude of the drive member 62 is the same, and the position of the link portion 62*a* is the same. Similarly, in FIG. 20B and FIG. 21B, FIG. 20C and FIG. 21C, and FIG. 20D and FIG. 21D, the attitude of the drive member 62 is the same, respectively, and the position of the link portion 62*a* is the same.

The drive member 62 is rotatable in a first rotating direction 621 and a second rotating direction 622 around the rotation axis 61*c*. When the conveyance roller 32 is rotated in the forward direction in which the paper is fed, the drive member 62 is rotated in the second rotating direction 622, and when the conveyance roller 32 is rotated in the reverse direction opposite to the forward direction, the drive member 62 is rotated in the first rotating direction 621. During the print operation, as shown in FIG. 21A, the drive member 62 is rotated in the second rotating direction 622, and the lever member 63 swings in the direction in which the engaging portion 63*b* retreats from above the scanning path of the carriage 41 and thus, the scanning of the carriage 41 is not regulated.

The cam surface 63*a* of the lever member 63 has a planar portion 63*a*1 and a curved portion 63*a*2. When the link portion 62*a* slides on the cam surface constituted by the planar portion 63*a*1 and the curved portion 63*a*2 and presses, the lever member 63 swings. Hereinafter, an operation in which the drive member 62 moves interlockingly with the lever member 63 will be explained.

First, the positional relationship and the attitude of each member changing with the rotation of the drive member 62 will be sorted into cases and explained. As described above, the drive member 62 is rotatable in the first rotating direction 621 and the second rotating direction 622 around the rotation axis 61*c*. Moreover, the lever member 63 is swingable in a first swing direction 631 and a second swing direction 632 around the swing axis 63*c* when the drive member 62 is rotated, and the cam surface 63*a* is pressed by the link portion 62*a*. FIG. 20A to FIG. 20D and FIG. 21A to FIG. 21D indicate a locus 623 of the link portion 62*a* moving with the rotation of the drive member 62 by a solid line.

FIG. 20A and FIG. 21A illustrate the attitudes of the drive member 62 and the lever member 63 when the image forming apparatus M is during the print operation, and the lock mechanism 60 is at the non-operating position. As shown in FIG. 21A, a first contact portion 63*d* of the lever member 63 is in contact with a first contacted portion 66*d* of the swing regulating member 66, and the lever member 63 has the swing in the first swing direction 631 regulated. Moreover, as shown in FIG. 20A, the link portion 62*a* of the drive member 62 is in contact with a part (cam surface 63*a*) of the lever member 63. Since the swing in the second swing direction 632 is regulated in the lever member 63, the rotation in the second rotating direction 622 is regulated in the drive member 62. That is, during the print operation, in the drive member 62, the attitude is determined by the lever member 63, and in the lever member 63, the attitude is determined by the swing regulating member 66.

Figure 21B:
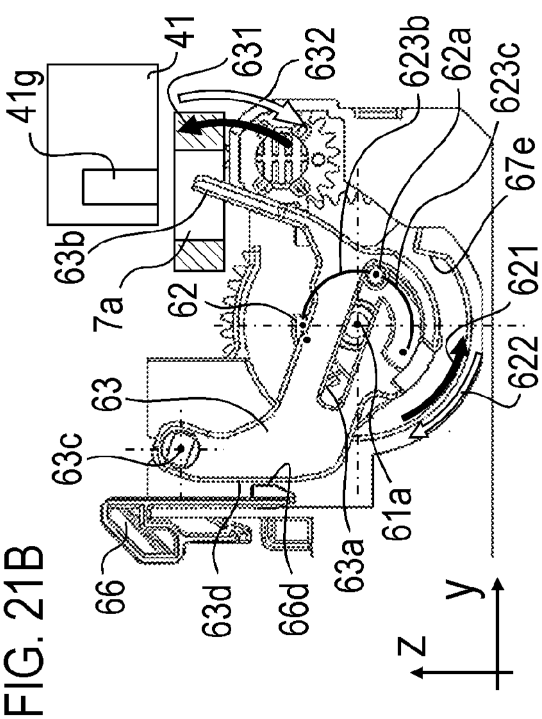

FIG. 20B and FIG. 21B illustrate the attitudes of the drive member 62 and the lever member 63 when the drive member 62 rotates in the first rotating direction 621 from the state shown in FIG. 20A and FIG. 21A, and the lock mechanism 60 is in the state changing from the non-operating position to the operating position. As shown in FIG. 20B, in the drive member 62, the rotation in the first rotating direction 621 and the second rotating direction 622 is regulated.

As shown in FIG. 21B, the link portion 62*a* is located at a border portion between the planar portion 63*a*1 and the curved portion 63*a*2. Then, when the lock mechanism 60 is at the non-operating position, a rotation center of the drive member 62 and an arc center of the curved portion 63*a*2 of the cam surface 63*a* match each other. Therefore, even if the drive member 62 changes from the state shown in FIG. 21A to the state shown in FIG. 21B, the link portion 62*a* does not press the cam surface 63*a*, and the attitude of the lever member 63 is not changed. And as shown in FIG. 21B, the first contact portion 63*d* of the lever member 63 is in contact with the first contacted portion 66*d* of the swing regulating member 66, and in the lever member 63, the swing in the second swing direction 632 is regulated.

Figure 21C:
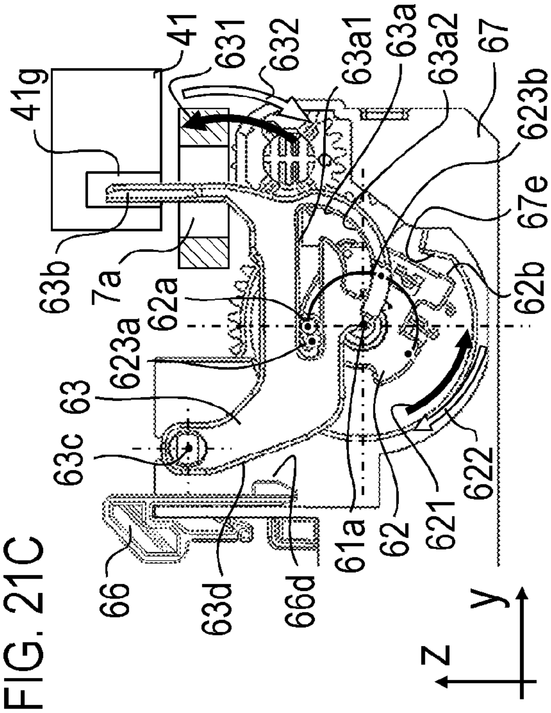

FIG. 20C and FIG. 21C illustrate the attitudes of the drive member 62 and the lever member 63 when the drive member 62 is rotated from the state shown in FIG. 20B and FIG. 21B in the first rotating direction 621, and the engaging portion 63*b* of the lever member 63 is located on the scanning path of the carriage 41. As shown in FIG. 20C, in the drive member 62, the rotation in the first rotating direction 621 and the second rotating direction 622 is not regulated.

In this embodiment, in the state shown in FIG. 21C, the lever member 63 and the carriage 41 are configured such that an engaged amount of the engaging portion 63*b* of the lever member 63 and the engaged portion 41*g* of the carriage 41 becomes the maximum, and a contact area becomes the maximum. At this time, the link portion 62*a* is located at a top dead center.

Figure 21D:
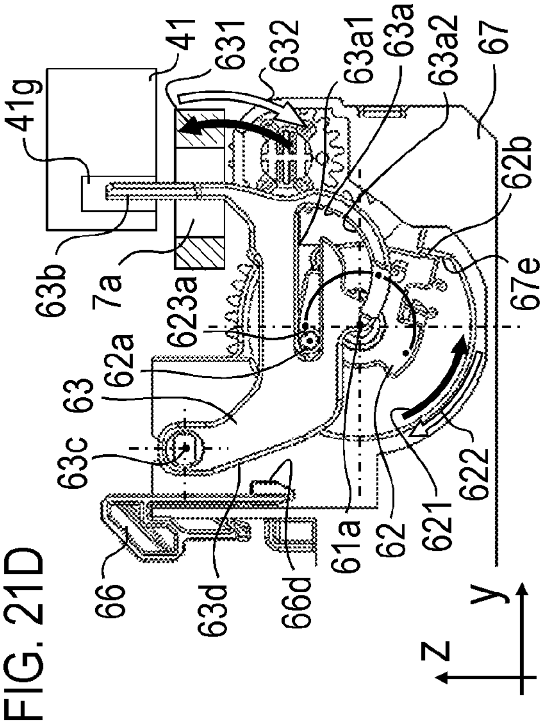

FIG. 20D and FIG. 21D illustrate the attitudes of the drive member 62 and the lever member 63 when the drive member 62 is rotated from the state shown in FIG. 20C and FIG. 21C to the first rotating direction 621. As shown in FIG. 20D, the second contact portion 62*b* of the drive member 62 is in contact with the second contacted portion 67*e* of the base member 67, and in the drive member 62, the rotation in the first rotating direction 621 is regulated. That is, the base member 67 functions as a regulating member which regulates the rotation of the drive member 62. In the following explanation, a state in which the drive member 62 and the lever member 63 are in the state shown in FIG. 21D, and the attitudes of the drive member 62 and the lever member 63 are determined is called a lock state.

Note that, in this embodiment, the second contacted portion 67*e* is configured to be provided on the base member 67, but it may be so configured that a member different from the base member 67 is provided so as to regulate the rotation of the drive member 62. As described above, when the attitudes of the drive member 62 and the lever member 63 are determined, and the lock mechanism 60 is brought into the lock state, even if the lever member 63 receives an external force, unintended retreat of the lever member 63 from above the scanning path of the carriage 41 can be prevented. Details of the lock state will be described later.

Subsequently, motions of each member when the drive member 62 is rotated will be explained. Note that, in the following explanation, in the locus 623 drawn by the link portion 62*a*, a range from a state shown in FIG. 20C to a state shown in FIG. 20D is referred to as a first region 623*a*. Similarly, in the locus 623 drawn by the link portion 62*a*, a range from a state shown in FIG. 20B to a state shown in FIG. 20C is referred to as a second region 623*b*, and a range from a state shown in FIG. 20A to a state shown in FIG. 20B is referred to as a third region 623*c*. In other words, in the second rotating direction 622 of the drive member 62, the second region 623*b* is located on a downstream side of the first region 623*a*, and the third region 623*c* is located on a downstream side of the second region 623*b*. In the following, an operation of the lever member 63 when the link portion 62*a* moves in the respective regions will be explained.

First, the motion of each member when the lock mechanism 60 changes from the state in FIG. 21A to the state in FIG. 21B will be explained. At this time, the link portion 62*a* moves in the third region 623*c*. As shown in FIG. 21A, and FIG. 21B, when the link portion 62*a* is in the third region 623*c*, the lever member 63 retreats from above the scanning path of the carriage 41, and the engaging portion 63*b* is at a position where it is not engaged with the engaged portion 41*g*. Moreover, as described above, even if the drive member 62 is rotated in the first rotating direction 621 from the state in FIG. 21A to the state in FIG. 21B, the cam surface 63*a* of the lever member 63 is not pressed by the link portion 62*a*. Therefore, even if the drive member 62 is rotated in the first rotating direction 621, the lever member 63 does not swing. That is, when the link portion 62*a* moves in the third region 623*c*, the link portion 62*a* slides on the cam surface 63*a*, but the cam surface 63*a* is not pressed by the link portion 62*a*. That is, the third region 623*c* of the locus 623 of the link portion 62*a* is a dead-band region in which the lever member 63 does not operate and is a region for a delay period until the lever member 63 enters onto the scanning path of the carriage 41.

Subsequently, motions of each member when the lock mechanism 60 changes from the state in FIG. 21B to the state in FIG. 21C will be explained. At this time, the link portion 62*a* moves in the second region 623*b*. As shown in FIG. 21B, FIG. 21C, when the link portion 62*a* is in the second region 623*b*, if the drive member 62 is rotated in the first rotating direction 621, the planar portion 63*a*1 of the cam surface 63*a* is pressed by the link portion 62*a*, and the lever member 63 swings in the first swing direction 631. That is, by means of the movement of the link portion 62*a* in the second region 623*b*, the engaging portion 63*b* of the lever member 63 enters onto the scanning path of the carriage 41.

Subsequently, motions of each member when the lock mechanism 60 changes from the state in FIG. 21C to the state in FIG. 21D will be explained. At this time, the link portion 62*a* moves in the first region 623*a*. When the link portion 62*a* is in the first region 623*a*, if the drive member 62 is rotated in the first rotating direction 621, the planar portion 63*a*1 of the cam surface 63*a* is pressed by the link portion 62*a*. Then, though a moving amount is very small, the lever member 63 swings in the second swing direction 632.

Note that, when the drive member 62 is rotated in the second rotating direction 622, and the aforementioned motion is performed in an opposite order, the lock mechanism 60 changes from the state in FIG. 21D to the state in FIG. 21A via the states in FIG. 21C and FIG. 21B. That is, by means of the conveyance motor 31, the drive member 62 is rotated in the first rotating direction 621 and the second rotating direction 622, whereby the lever member 63 enters onto the scanning path of the carriage 41 or retreats from above the scanning path.

Lock State of Swing Member

Subsequently, with reference to FIG. 22A and FIG. 22B, details of the lock state of the lock mechanism 60, when the attitudes of the drive member 62 and the lever member 63 are determined, will be explained. For example, when the lever member 63 moves to the non-operating position where the lever member 63 does not regulate the scanning of the carriage 41 by an impact in a physical distribution process of the image forming apparatus M, the carriage 41 moves unintentionally, which could incur damage on the carriage 41 or nonconformity in an image forming operation. Thus, in this embodiment, in order to prevent the unintended movement of the lever member 63 located at the operating position to the non-operating position, the lock mechanism 60 is brought into the lock state.

Figure 22B:
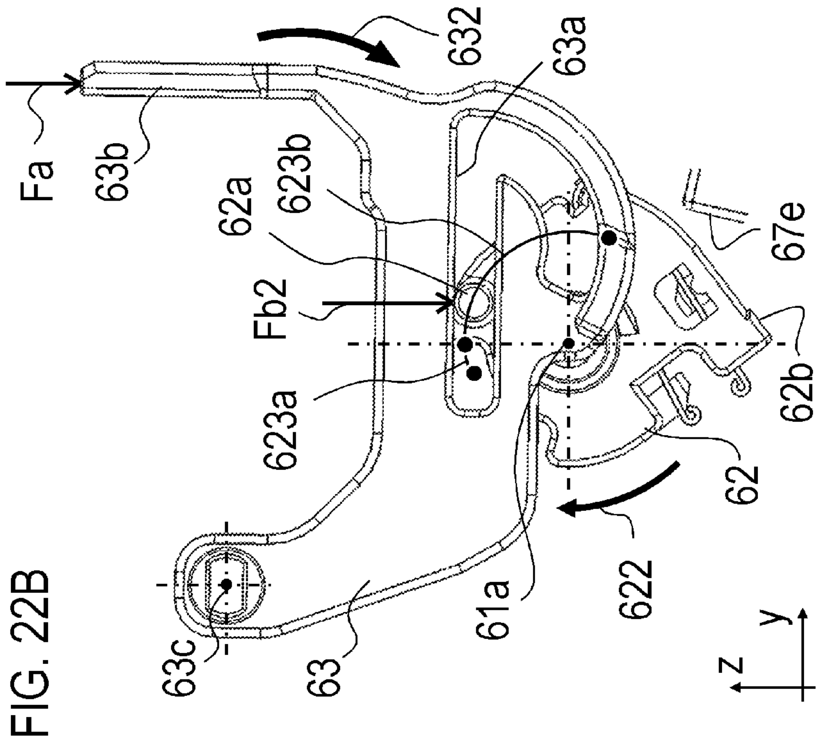
FIG. 22A and FIG. 22B are side views illustrating a lock state of the lock mechanism according to the third embodiment.
Figure 22A:
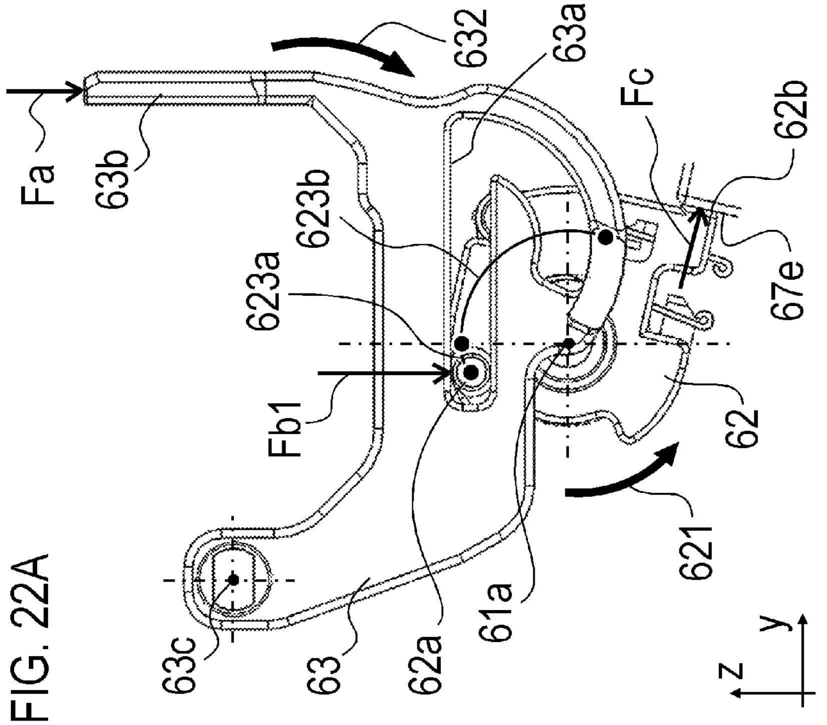

FIG. 22A illustrates a state where an external force Fa which causes the lever member 63 to swing in the second swing direction 632 acts, when the link portion 62*a* of the drive member 62 is located in the first region 623*a*. The attitude of the drive member 62 at this time is assumed to be a first angle. When the lever member 63 at the non-operating position is to swing in the second swing direction 632 by the external force Fa, a force Fb1 is applied from the cam surface 63*a* to the link portion 62*a*. Then, the force Fb1 acts on the drive member 62 at the first angle in a direction in which the drive member 62 is rotated in the first rotating direction 621.

At the first angle, since the second contact portion 62*b* is in contact with the second contacted portion 67*e* of the base member 67, in the drive member 62 which received the force Fb1, the rotation in the first rotating direction 621 is regulated. Since the drive member 62 is not rotated, in the lever member 63, too, the swing in the second swing direction 632 is regulated by the cam surface 63*a*. That is, at this time, a force Fc applied to the second contacted portion 67*e* from the second contact portion 62*b* is balanced with a reaction force received by the drive member 62 from the second contacted portion 67*e*, and the attitudes of the drive member 62 and the lever member 63 are not changed. By configuring as above, even if the external force acts on the lever member 63 in the lock state, the swing of the lever member 63 in the second swing direction 632 is regulated, and the lock state of the lock mechanism 60 is maintained. In other words, when the link portion 62*a* is located in the first region 623*a*, and the drive member 62 is at the first angle, the rotation of the drive member 62 in the first rotating direction 621 is regulated by the second contacted portion 67*e*, and the attitude of the lever member 63 is also maintained.

FIG. 22B illustrates a state where the external force Fa to cause the lever member 63 to swing in the second swing direction 632 acts, when the link portion 62*a* of the drive member 62 is located in the second region 623*b*. When the drive member 62 at the first angle rotates in the second rotating direction 622, the link portion 62*a* moves from the first region 623*a* to the second region 623*b*. The attitude of the drive member 62 at this time is assumed to be a second angle. When the drive member 62 is at the second angle, the link portion 62*a* is located in the second drive region 632*b*.

As described above, the external force Fa acts in the direction in which the lever member 63 is caused to swing in the second swing direction 632. At this time, a force Fb2 is applied from the cam surface 63*a* to the link portion 62*a*. The Force Fb2 acts on the drive member 62 at the second angle in the direction in which the drive member 62 is rotated in the second rotating direction 622. Then, the drive member 62 is rotated in the second rotating direction 622 without having the rotation regulated, and the lever member 63 swings in the second swing direction 632.

Moreover, according to the configuration of this embodiment, to the contrary to FIG. 22A, even if a force to rotate the lever member 63 in the first swing direction 631 acts, the lever member 63 holds a position where the engaging portion 63*b* can be brought into contact with the engaged portion 41*g*. That is because the drive member 62 and the lever member 63 change from the state in FIG. 21D to the state in FIG. 21C, and the motions are stopped. Therefore, even if the external force acts in the direction, a movement amount of the lever member 63 is small, and the lever member 63 is held at a certain position.

As described above, according to this embodiment, when the lock mechanism 60 is in the lock state, even if the external force acts on the lever member 63, movement of the lever member 63 from the operating position can be prevented. Moreover, since the rotation of the drive member 62 is regulated by the base member 67, the lever member 63 rarely moves but is held at a certain position. Thus, movement of the carriage 41 from the capping position can be prevented stably. Furthermore, in the lock state, since the lever member 63 rarely moves, there is no need to design the engaged portion 41*g* of the carriage 41 by considering the movement amount of the lever member 63, and a size of the engaged portion 41*g* can be kept to the minimum.

Regulating Member

Subsequently, with reference to FIG. 21A to FIG. 21D, the swing regulating member 66 will be explained. The swing regulating member 66 is a member that can be detachably attached to the base member 67. When the swing regulating member 66 is attached to the base member 67, it is located on a swing path of the lever member 63 and is capable of regulating the swing of the lever member 63.

In the following explanation, a state of the lever member 63 when the engaging portion 63*b* of the lever member 63 is not present on the scanning path of the carriage 41, and the engaging portion 63*b* is inserted inside the opening portion 7*a* is assumed to be a first state. As shown in FIG. 21A and FIG. 21B, when the lever member 63 is in the first state, the lock mechanism 60 is at the non-operating position. Moreover, a state of the lever member 63 when the engaging portion 63*b* of the lever member 63 penetrates the inside of the opening portion 7*a*, and the engaging portion 63*b* is on the scanning path of the carriage 41 is assumed to be a second state. As shown in FIG. 21C and FIG. 21D, when the lever member 63 is in the second state, the lock mechanism 60 is at the operating position. That is, the lever member 63 is capable of swing between the second state and the first state by the rotation of the drive member 62. As described above, the lever member 63 in the first state swings in the first swing direction 631 by the rotation in the first rotating direction 621 of the drive member 62 and changes to the second state. On the contrary, the lever member 63 in the second state swings in the second swing direction 632 by the rotation in the second rotating direction 622 of the drive member 62 and changes to the first state.

In the lever member 63 in the first state, the swing in the second swing direction 632 is regulated by the contact of the first contact portion 63*d* with the first contacted portion 66*d* of the swing regulating member 66. That is, in the state where the swing regulating member 66 is attached to the base member 67, at least a part of the engaging portion 63*b* of the lever member 63 is located above a lower surface of the opening portion 7*a* and is inserted inside the opening portion 7*a*. Therefore, as shown in FIG. 19D, in the engaging portion 63*b*, the movement in the scanning direction 411 (x-direction) of the carriage 41 is regulated by inner peripheral surfaces 7*e*, 7*f* of the opening portion 7*a* at all time and thus, the positional accuracy of the engaging portion 63*b* with respect to the carriage 41 is held high. Therefore, when the lock mechanism 60 is in the lock state, the carriage 41 is reliably held at the predetermined capping position.

Mounting Method of Drive Portion

Figure 23B:
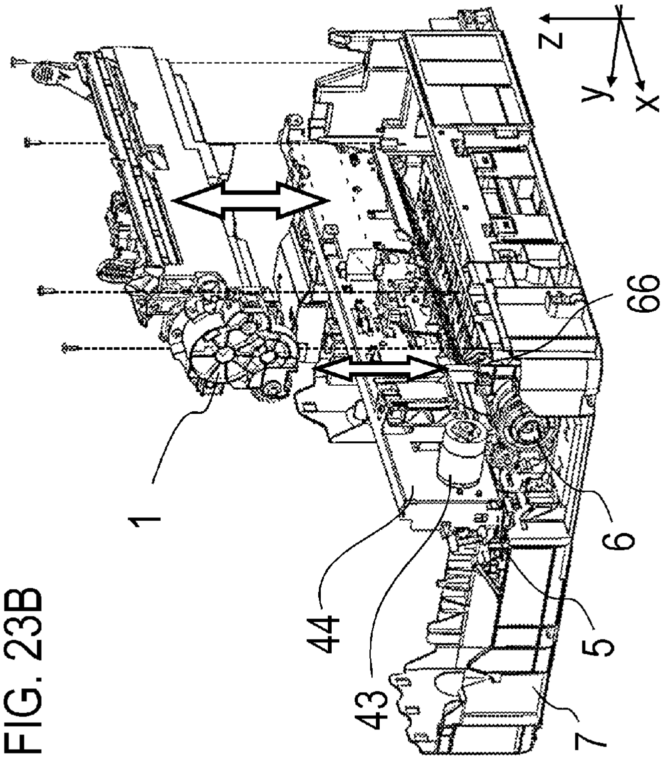
FIG. 23A and FIG. 23B are views illustrating a mounting position of a regulating member according to the third embodiment.
Figure 23A:
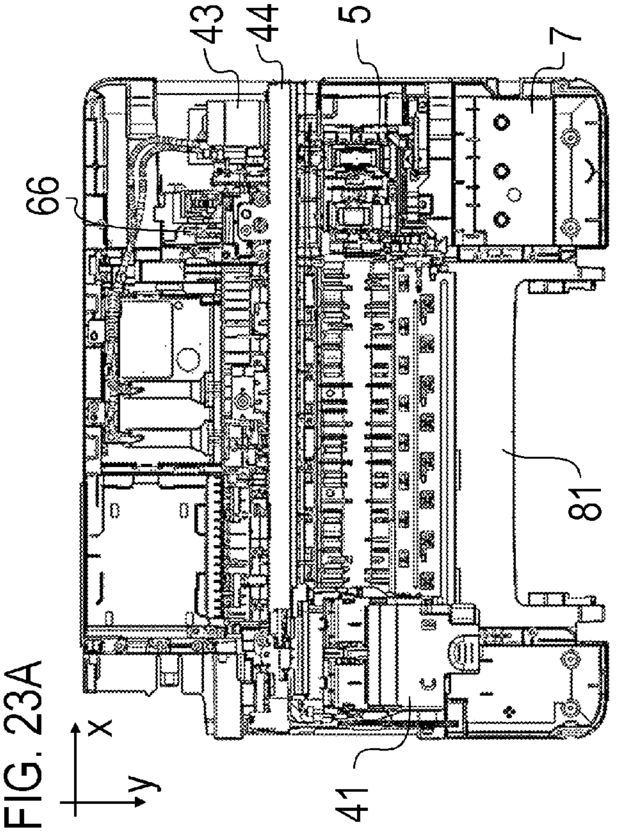

Subsequently, with reference to FIG. 23A, FIG. 23B, FIG. 24A, FIG. 24B, a method of mounting the drive portion 6 on the main-body base 7 will be explained. FIG. 23A is a top view illustrating a state of the inside of the image forming apparatus M in which the paper feed portion 1 has been removed from the main-body base 7. FIG. 23B is a perspective view illustrating a state where the paper feed portion 1 is detachably attached to the main-body base 7.

The paper feed portion 1 can be detachably attached to the main-body base 7 by being moved in the vertical direction (z-direction) with respect to the main-body base 7 and is fixed to the main-body base 7 by a screw member or the like. The swing regulating member 66 can be detachably attached to the image forming apparatus M (base member 67) in a state where the paper feed portion 1 is removed from the main-body base 7. That is, in an attachment/detachment work of the swing regulating member 66, there is no need to remove the conveying portion 3, the chassis 44, and the maintenance portion 5 from the main-body base 7.

Figure 24B:
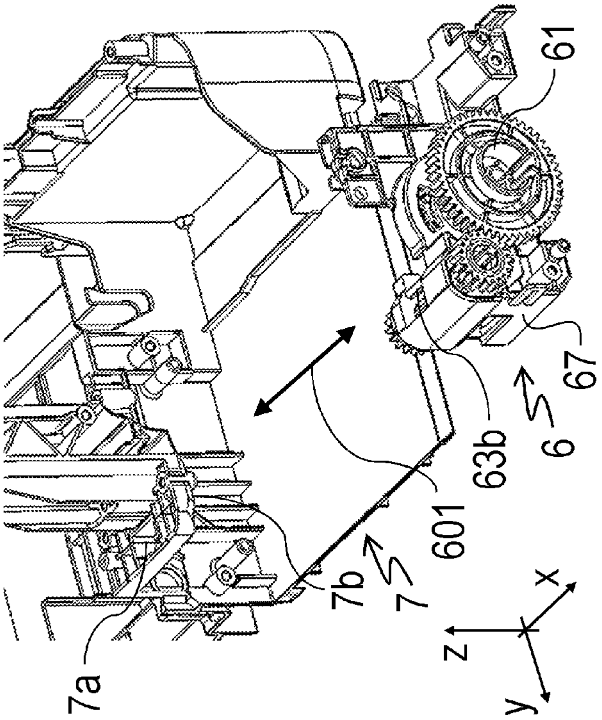
FIG. 24A and FIG. 24B are views illustrating a mounting method of the drive portion according the third embodiment.
Figure 24A:
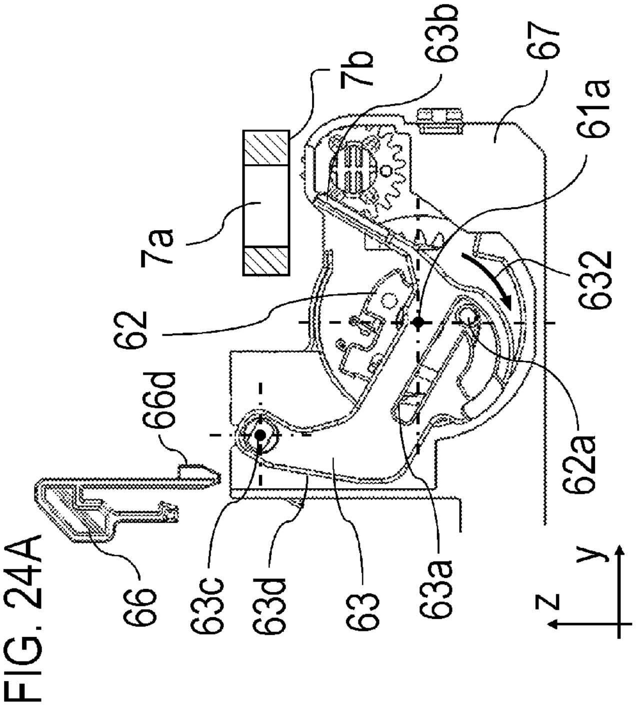

FIG. 24A is a side view illustrating a state of the drive member 62 and the lever member 63 when the swing regulating member 66 is removed from the base member 67. FIG. 24B is a perspective view illustrating a state where the drive portion 6 is detachably attached to the main-body base 7.

When the swing regulating member 66 is removed from the base member 67, contact between the first contact portion 63*d* and the first contacted portion 66*d* is released, and the lever member 63 is brought into a state capable of swing in the second swing direction 632 from the first state. FIG. 24A illustrates a state where the lever member 63 swings from the first state in the second swing direction 632 and changes to the third state. In the third state, the engaging portion 63*b* of the lever member 63 is removed from the inside of the opening portion 7*a* of the main-body base 7 and moves to a position lower than a lower surface 7*b* of the opening portion 7*a*. When the lever member 63 moves to the third state, the drive portion 6 is brought into a state capable of moving in an arrow 601 direction shown in FIG. 24B, and the drive portion 6 can be removed from the main-body base 7.

On the other hand, when the drive portion 6 is to be mounted on the main-body base 7, the swing regulating member 66 is removed, and in a state where the lever member 63 is in the third state, the drive portion 6 is moved in the arrow 601 direction. Then, after the drive portion 6 is positioned with respect to the main-body base 7, the swing regulating member 66 is mounted on the base member 67, whereby the lever member 63 changes to the first state, and the engaging portion 63*b* of the lever member 63 is located inside the opening portion 7*a*.

As described above, according to this embodiment, attachment/detachment of the swing regulating member 66 can be performed easily, and workability of the attachment/detachment of the drive portion 6 with respect to the main-body base 7 is favorable. Moreover, in a state where the drive portion 6 is mounted on the main-body base 7, the lever member 63 does not move to the third state by the swing regulating member 66 but swings only between the first state and the second state and thus, the positional accuracy of the lever member 63 with respect to the main-body base 7 is guaranteed.

Fourth Embodiment

Subsequently, with reference to FIG. 25A to FIG. 25C, a fourth embodiment of the present invention will be explained. In the third embodiment, the movement in the scanning direction of the carriage 41 of the recording portion 4 is regulated by the lever member 63 of the lock mechanism 60. On the other hand, in the fourth embodiment, by using the lever member 63 of the lock mechanism 60, which can enter onto the scanning path of the recording portion 4, an inter-paper distance between the recording head 42 and the recording medium is adjusted. In the following explanation, for configurations similar to those in the third embodiment, the same signs are given, and explanation will be omitted.

Inter-Paper Switching Mechanism

Figure 25A:
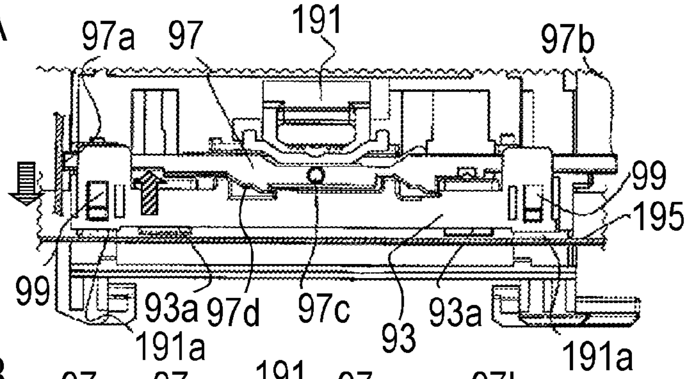
FIG. 25A to FIG. 25C are diagrams for explaining an inter-paper switching operation of a recording portion according to a fourth embodiment.
Figure 25B:
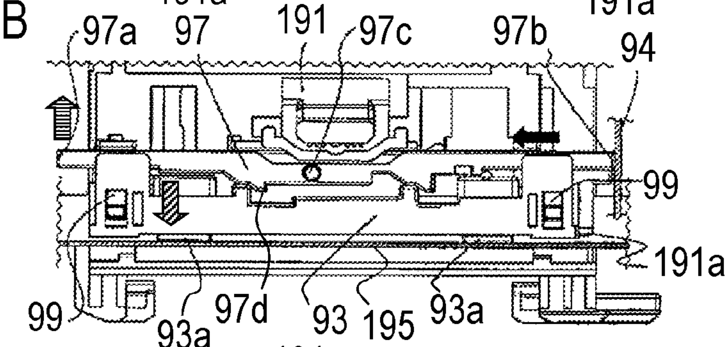
Figure 25C:
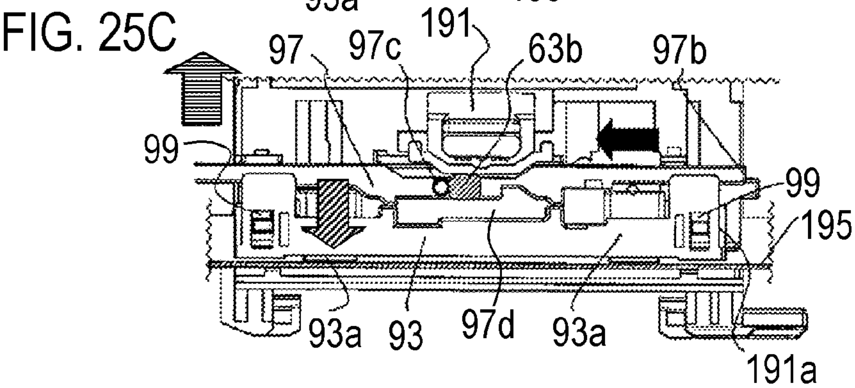

With reference to FIG. 25A to FIG. 25C, an inter-paper switching operation of the recording portion 9 using the engaging portion 63*b* of the lever member 63 will be explained. FIG. 25A to FIG. 25C are views of the recording portion 9 when seen from a rear surface on a side opposite to a side where the recording head is mounted. The recording portion 9 has a carriage 191 supporting the recording head (not shown), a sliding member 93 mounted on the carriage 191, an L-shaped guide rail 195 mounted on a chassis 94, and a switching member 97 for adjusting relative positions of the carriage 191 and the sliding member 93. The recording head of this embodiment ejects a liquid such as ink toward a lower part in a height direction (up-down direction in FIG. 25A). Moreover, the carriage 191 performs scanning in a left-right direction in FIG. 25A integrally with the recording head.

FIG. 25A illustrates a state where the recording portion 9 as a carriage unit is located at a normal position in the height direction. The recording portion 9 is located at the normal position mainly when a high grade is required for a recorded image, and the recording operation is performed for the recoding medium other than a cardboard such as an envelope. At the normal position, regarding the carriage 191, a sliding surface 191*a* facing downward in the height direction (lateral-lined arrow direction in FIG. 25A) is brought into contact with the guide rail 195 by its own weight, and a position in the vertical direction is determined.

On the other hand, in the height direction, a sliding surface 93*a* facing a lower part of the sliding member 93 is located at a position higher than the sliding surface 191*a* of the carriage 191 and thus, the sliding surface 93*a* is not brought into contact with the guide rail 195. An urging spring 99 is mounted on the sliding member 93, and the sliding member 93 is urged by the urging spring 99 to an upper part in the height direction (a shaded arrow direction in FIG. 25A). Moreover, the sliding member 93 is positioned in the scanning direction with respect to the carriage 191 at a spot where the urging spring 99 is mounted, is in contact with the carriage 191, and is positioned also in the height direction. By configuring as above, the sliding surface 93*a* of the sliding member 93 is not brought into contact with the guide rail 195 at the normal position.

Moreover, on the rear surface of the carriage 191, the switching member 97 is mounted between the carriage 191 and the sliding member 93. The switching member 97 has a shape elongated in the scanning direction and is configured to be movable in the scanning direction. On the switching member 97, a cam surface 97*d* is formed as an adjusting cam which relatively displaces the carriage 191 and the sliding member 93 in the height direction in plural stages.

When the recording portion 9 is moved in the scanning direction in a state where both end portions 97*a*, 97*b* in the scanning direction of the switching member 97 abut against a side surface portion of the chassis 94, the switching member 97 slides in the scanning direction with respect to the carriage 191 and the sliding member 93. Moreover, a cylindrical engaged portion 97*c* is provided on the switching member 97 and is configured to be capable of slide movement also by the contact of the engaged portion 97*c* with the engaging portion 63*b* of the lever member 63. Furthermore, the switching member 97 is positioned by the carriage 191 in the upper direction, while being positioned by the sliding member 93 in the lower direction in the height direction.

FIG. 25B illustrates a state in which the recording head is positioned higher than the normal position illustrated in FIG. 25A, whereby the inter-paper distance is widened, and the recording portion 9 is positioned at an envelope position. In a case where the recording medium is a cardboard such as an envelope or in a case where the recording medium is made of a material which is curled extremely easily, in order to widen a gap (inter-paper) between the recording head and the recording medium, the recording portion 9 is switched from the normal position to the envelope position.

When the recording is performed at the envelope position, the recording portion 9 causes the end portion 97*b* of the switching member 97 to collide against the side surface portion of the chassis 94. By means of this collision, the switching member 97 starts slide movement in a direction of a black arrow indicated in FIG. 25B relatively to the carriage 191 and the sliding member 93. Then, the sliding member 93 moves to a lower direction (shaded arrow direction in FIG. 25B) by the cam surface 97*d* provided on the switching member 97. Regarding the sliding member 93, the sliding surface 93*a* is brought into contact with the guide rail 195 and is positioned in the vertical direction. After that, the sliding member 93 is to further move in a lower direction by the cam surface 97*d*, but it is hindered by the guide rail 195. Then, the reaction force is transmitted to the carriage 191 which regulates the switching member 97 and the upper direction of the switching member 97 via the cam surface 97*d*. As a result, the carriage 191 and the switching member 97 moves in the upper direction (lateral-lined arrow direction in FIG. 25A to FIG. 25C). When the end portion 97*b* of the switching member 97 is pushed in until this state, the switching member 97 is brought into contact with the carriage 191 in the scanning direction and does not move in the scanning direction anymore. By configuring as above, the recording portion 9 is switched from the normal position to the envelope position. At this time, since the carriage 191 has moved in the upper direction, the sliding surface 191*a* of the carriage 191 is away from the guide rail 195. And the carriage 191 is positioned in the height direction with respect to the guide rail 195 via the sliding member 93 and the switching member 97.

FIG. 25C illustrates a state of the recording portion 9 whose inter-paper distance was widened as compared with the envelope position shown in FIG. 25B. As described above, the engaging portion 63*b* of the lever member 63 is configured to be capable of entering onto the scanning path of the recording portion 9 and of retreating from above the scanning path by the drive of the conveyance motor 31, which is a drive source. In this embodiment, when the engaging portion 63*b* enters onto the scanning path of the recording portion 9, the engaging portion 63*b* moves to a position capable of contact with the engaged portion 97*c* of the switching member 97. Thus, in the state where the lever member 63 is at the operating position, and the engaging portion 63*b* is located on the scanning path of the recording portion 9, when the recording portion 9 is subjected to the scanning from the left to the right in FIG. 25C, the switching member 97 is brought into contact with the engaging portion 63*b*. Then, the switching member 97 relatively moves with respect to the carriage 191 and the sliding member 93 and slides in a black arrow direction in FIG. 25C. In a state where the switching member 97 has slid to the state in FIG. 25C, the relative distance in the height direction between the carriage 191 and the sliding member 93 has been widened by the cam surface 97*d* of the switching member 97. In other words, as shown in FIG. 25C, since the movement of the switching member 97 is regulated by the engaging portion 63*b*, the carriage 191 moves in the upper direction (lateral-lined arrow direction), while the sliding member 93 moves in the lower direction (shaded arrow direction). And by means of the movement of the carriage 191 to the upper side in the height direction, the recording head supported by the carriage 191 also moves to the upper side in the height direction, whereby the inter-paper distance is widened.

Note that, when the recording portion 9 is brought into contact with the engaging portion 63*b* from the right to the left in the figure in a position state shown in FIG. 25C, the switching member 97 slides in a direction opposite to the black arrow direction in FIG. 25C and as a result, the recording portion 9 returns to the state shown in FIG. 25A. By providing the engaging portion 63*b* with the configuration as above, the further inter-paper switching operation of the recording portion 9 can be performed.

As described above, according to this embodiment, by using both the operation of causing the switching member 97 to abut against the chassis 94 and the operation of causing the switching member 97 to abut against the lever member 63, inter-paper positions for the recording portion 9 can be set at three spots or more. Moreover, since the unintended swing of the lever member 63 from the operating position to the non-operating position upon receipt of the external force can be prevented, the inter-paper distance can be stably switched.

Note that, the application of the present invention is not limited to the configuration of the embodiments described above but the application can be made also to the other configurations within a range that the identity of the invention is not lost. For example, the present invention can be also applied to such a configuration that a lever member for locking at the capping position of the carriage and the lever member for inter-paper switching are provided individually, and each of them can enter onto and retreat from the scanning path of the recording means. Moreover, the mechanism in which the rotating member causes the swing member to swing is not limited to the configuration using the cam surface and the link portion described above, but various changes can be made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-120131, filed on Jul. 28, 2022 and Japanese Patent Application No. 2022-126908, filed on Aug. 9, 2022, which are hereby incorporated by reference herein in their entirety.

What is claimed is:

1. A recording device comprising:

a drive source;

a driven portion having a driven gear;

a drive transmission mechanism having a drive gear driven by the drive source, the drive transmission mechanism swingable between a first position where the drive gear is engaged with the driven gear and a second position where the drive gear is not engaged with the driven gear a regulating mechanism swingable between a regulating position where swing of the drive transmission mechanism is regulated and a non-regulating position where the swing of the drive transmission mechanism is not regulated;

a carriage on which a recording head performing recording on a recording medium is mounted and which reciprocates for scanning; and an urging member which urges the regulating mechanism in a direction to swing the regulating mechanism from the regulating position to the non-regulating position, wherein the carriage is positionable to presses the regulating mechanism and cause the regulating mechanism to swing around a rotation axis of the driven gear from the non-regulating position to the regulating position.

2. The recording device according to claim 1, wherein, in the regulating position, the regulating mechanism regulates swing of the drive transmission mechanism at the first position toward the second position.

3. The recording device according to claim 2, wherein the regulating mechanism regulates swing of the drive transmission mechanism at the second position toward the first position.

4. The recording device according to claim 1, further comprising:

a first regulating member which regulates swing of the drive transmission mechanism in a direction in which the drive gear approaches the driven gear, in a case where the drive transmission mechanism is at the first position; and a second regulating member which regulates swing of the drive transmission mechanism in a direction in which the drive gear is separated away from the driven gear, in a case where the drive transmission mechanism is at the second position.

5. The recording device according to claim 1, wherein the drive transmission mechanism further has a sun gear to which a drive force of the drive source is transmitted, wherein the drive gear is a planetary gear engaged with the sun gear, and wherein the drive transmission mechanism swings around a rotation axis of the sun gear.

6. The recording device according to claim 5, wherein in a case where the drive transmission mechanism is at the first position, seen from a rotation axis direction of the planetary gear, a straight line connecting a rotation center of the planetary gear and a rotation center of the driven gear is orthogonal to a straight line connecting a rotation center of the planetary gear and a swing center of the drive transmission mechanism.

7. The recording device according to claim 1, wherein the drive source is a motor capable of forward and reverse rotation, wherein, by rotation of the motor in a first direction, the drive transmission mechanism swings from the second position to the first position, and by rotation in a second direction, which is opposite to the first direction, the drive transmission mechanism swings from the first position to the second position.

8. The recording device according to claim 1, wherein the driven portion is a paper feed portion which feeds a recording medium.

9. The recording device according to claim 1, wherein the driven portion is a first driven portion, and wherein the recording device further comprises a second driven portion connected to the drive gear in a case where the drive transmission mechanism is at the second position.

10. A recording device comprising:

a drive source;

a driven portion having a driven gear;

a drive transmission mechanism having a drive gear driven by the drive source, the drive transmission mechanism swingable between a first position where the drive gear is engaged with the driven gear and a second position where the drive gear is not engaged with the driven gear; and a regulating mechanism swingable between a regulating position where swing of the drive transmission mechanism is regulated and a non-regulating position where the swing of the drive transmission mechanism is not regulated, wherein the regulating mechanism includes a regulating member and a protruding portion, the regulating member having an arm portion which extends in a direction orthogonal to a rotation axis of the driven gear and swings around the rotation axis of the driven gear, the protruding portion protruding from the arm portion in a direction orthogonal to the rotation axis of the driven gear, and wherein in the regulating position, the protruding portion is brought into contact with the drive transmission mechanism and regulates swing of the drive transmission mechanism.

11. The recording device according to claim 10, wherein the drive transmission mechanism has an axial support portion which axially supports the drive gear; and in a case where the regulating mechanism is at the regulating position, the protruding portion is located on a swing locus of the axial support portion.

12. The recording device according to claim 11, wherein the protruding portion includes a first surface in contact with the axial support portion in a case where the drive transmission mechanism is at the first position and a second surface in contact with the axial support portion in a case where the drive transmission mechanism is at the second position.

13. The recording device according to claim 10, further comprising:

a pressing means for pressing and causing the regulating mechanism to swing from the non-regulating position to the regulating position; and an urging member which urges the regulating member in a direction of swinging the regulating member from the regulating position to the non-regulating position.

14. The recording device according to claim 13, wherein the pressing means is recording means on which a recording head performing recording on a recording medium is mounted and which reciprocates for scanning, and wherein the recording means is movable between a pressing position where the regulating mechanism is pressed and a non-pressing position separated away from the regulating mechanism.

15. A recording device comprising:

a drive source;

a driven portion having a driven gear;

a drive transmission mechanism having a drive gear driven by the drive source, the drive transmission mechanism swingable between a first position where the drive gear is engaged with the driven gear and a second position where the drive gear is not engaged with the driven gear; and a regulating mechanism swingable between a regulating position where swing of the drive transmission mechanism is regulated and a non-regulating position where the swing of the drive transmission mechanism is not regulated;

a recording means on which a recording head performing recording on a recording medium is mounted and which reciprocates for scanning; and a lock mechanism which is caused to swing by the drive source and is capable of swing between an operating position where scanning of the recording means is regulated and a non-operating position where the scanning of the recording means is not regulated, wherein the regulating mechanism swings around a rotation axis of the driven gear.

16. The recording device according to claim 15, wherein the lock mechanism has a lever member which is located on a scanning path of the recording means and is brought into contact with the recording means in a case of being at the operating position, and retreats from the scanning path in a case of being at the non-operating position.

17. The recording device according to claim 16, wherein the drive transmission mechanism further has an input shaft rotated and driven by the drive source and a sun gear to which a drive force is transmitted by the input shaft and is rotatable around a rotation axis of the input shaft, wherein the lock mechanism further has a rotating member which transmits drive to the lever member and is rotatable around the rotation axis of the input shaft by the drive force transmitted by the input shaft, wherein the recording device further includes two axial support members having axial support portions which axially support the input shaft, wherein the sun gear is disposed between two axial support members, and wherein the rotating member and the lever member are provided on a side opposite to the sun gear with respect to one of the axial support members.

18. The recording device according to claim 17, wherein the input shaft has a cylinder portion on an end portion in an axis direction of the rotation axis of the input shaft, and wherein the rotating member is axially supported by the cylinder portion of the input shaft.

19. The recording device according to claim 17, wherein the recording device further includes a suctioning mechanism which suctions a liquid from the recording head, wherein the suctioning mechanism further has a rotating member which can rotate around the rotation axis of the input shaft by a drive force transmitted to the input shaft and can switch between suctioning and non-suctioning in accordance with a rotating direction of the rotating member, and wherein the rotating member is provided on a side opposite to the sun gear with respect to the other one of the axial support members.

* * * * *